US012759019B1

(12) United States Patent
Karmiol et al.

(10) Patent No.: US 12,759,019 B1
(45) Date of Patent: Oct. 13, 2026

(54) TREATMENT PROCESS FOR CORROSION-RESISTANT METAL

(71) Applicant: Triad National Security, LLC, Los Alamos, NM (US)

(72) Inventors: Benjamin Karmiol, Santa Fe, NM (US); Enkeleda Dervishi-Whetham, Los Alamos, NM (US); Michael McBride, Los Alamos, NM (US); Alexander Edgar, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 17/689,662

(22) Filed: Mar. 8, 2022

Related U.S. Application Data

(60) Provisional application No. 63/158,674, filed on Mar. 9, 2021.

(51) Int. Cl.

| | |
|---|---|
| ***B05D 3/10*** | (2006.01) |
| ***B05D 7/14*** | (2006.01) |
| ***C09D 7/40*** | (2018.01) |
| ***C09D 7/61*** | (2018.01) |
| ***C09D 127/16*** | (2006.01) |
| ***C09D 127/18*** | (2006.01) |
| ***C09D 129/10*** | (2006.01) |
| ***C09K 13/12*** | (2006.01) |
| ***C25F 3/06*** | (2006.01) |
| ***C25F 3/08*** | (2006.01) |
| *C08K 3/04* | (2006.01) |
| *C08K 3/34* | (2006.01) |

(52) U.S. Cl.
CPC ............... *B05D 3/102* (2013.01); *B05D 7/14* (2013.01); *C09D 7/61* (2018.01); *C09D 7/67* (2018.01); *C09D 127/16* (2013.01); *C09D 127/18* (2013.01); *C09D 129/10* (2013.01); *C09K 13/12* (2013.01); *C25F 3/06* (2013.01); *C25F 3/08* (2013.01); *C08K 3/041* (2017.05); *C08K 3/34* (2013.01); *C08K 2201/011* (2013.01)

(58) Field of Classification Search
CPC . B05D 3/102; B05D 7/14; C09D 7/61; C09D 7/67; C09D 127/16; C09D 127/18; C09D 129/10; C09K 13/12; C25F 3/06; C25F 3/08; C08K 3/041; C08K 3/34; C08K 2201/011
See application file for complete search history.

(56) References Cited

PUBLICATIONS

Amiri et al. "Graphene oxide/polydimethylsiloxane-coated stainless steel mesh for use in solid-phase extraction cartridges and extraction of polycyclic aromatic hydrocarbons" Microchimica Acta 2020 187:213.*

(Continued)

*Primary Examiner* — Robert S Walters, Jr.
(74) *Attorney, Agent, or Firm* — Klarquist Sparkman, LLP

(57) ABSTRACT

A method for providing a coated metal surface includes etching a metal surface with an etching solution comprising an oxidizing ion provide an etched metal surface; coating at least a portion of the etched metal surface with a liquid composition comprising a polymer, a prepolymer and a crosslinking agent, or a combination thereof to provide a polymeric coating on the etched metal surface; and drying or curing the polymeric coating to form a coated metal surface. The liquid composition may further include a plurality of nanoparticles.

13 Claims, 11 Drawing Sheets

(56) References Cited

PUBLICATIONS

Cremaldi et al. "Fabrication of bioinspired, self-cleaning superliquiphilic/phobic stainless steel using different pathways" Journal of Colloid and Interface Science 518 (2018) 284-297.*

Kong et al. "Carbon nanotubes-bridged-fumed silica as an effective binary nanofillers for reinforcement of silicone elastomers" Composites Science and Technology, vol. 169, 2019, pp. 232-241. (Year: 2019).*

Liu et al. "Simple, rapid and green one-step strategy to synthesis of graphene/carbon nanotubes/chitosan hybrid as solid-phase extraction for square-wave voltammetric detection of methyl parathion" Colloids and Surfaces B: Biointerfaces 108 (2013) 266-270. (Year: 2013).*

Jena et al. "Fabrication of silanized GO hybrid coating on 316L SS with enhanced corrosion resistance and antibacterial properties for marine applications" Surface & Coatings Technology 402 (2020) 126295 (Year: 2020).*

Jing et al. "Water-based polyurethane composite anticorrosive barrier coating via enhanced dispersion of functionalized graphene oxide in the presence of acidified multi-walled carbon nanotubes" Progress in Organic Coatings 146 (2020) 105734 (Year: 2020).*

Khun et al. "Effects of carbon nanotube content on adhesion strength and wear and corrosion resistance of epoxy composite coatings on AA2024-T3" Progress in Organic Coatings 77 (2014) 72-80.*

Kumar et al. "MWCNTs toward superior strength of epoxy adhesive joint on mild steel adherent" Composites Part B 143 (2018) 207-216.*

Singh et al. "Graphene and carbon nanotube reinforced epoxy nanocomposites: A review" Polymer 180 (2019) 121724.*

Karmiol, et al., "Electrochemical approach to metal decontamination," Nov. 7, 2019 (25 pages).

Karmiol, et al., "Stainless Steel Coating Test Report," *Report*, Jul. 10, 2020 (20 pages).

Karmiol, "Integrated Electrochemical Decontamination and Etching System," *Tech Snapshot*, first published Oct. 8, 2020 (4 pages).

Karmiol, "Corrosion and Biofouling Solutions," *DisrupTECH*, Oct. 14, 2020 (18 pages).

Rodriguez, et al., "High Efficiency Automated Leaching of Glove Boxes," *JOWOG 22/2*presented Jul. 18, 2019 (34 pages).

* cited by examiner

TREATMENT PROCESS FOR CORROSION-RESISTANT METAL

CROSS REFERENCE TO RELATED APPLICATION

This application claims the benefit of the earlier filing date of U.S. Provisional Application No. 63/158,674, filed Mar. 9, 2021, which is incorporated by reference in its entirety herein.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

This disclosure concerns a method for etching a metal surface and coating the etched metal surface with a polymeric composition.

BACKGROUND

Metal surfaces are prone to contamination under many environmental conditions. Many cleaning processes that remove the contaminants, e.g., electrochemical etching, may produce surfaces that are difficult to clean again after further use and contamination. While it is desirable to coat the metal surfaces to resist contamination and/or make the surfaces easier to clean, some metal surfaces, such as stainless steel, are particularly difficult to coat effectively. Thus, a need exists for a method to clean and effectively coat metal surfaces with a wear- and contamination-resistant coating.

SUMMARY

A method for etching a metal surface and coating the etched metal surface with a polymeric composition is disclosed. In some embodiments, the method includes etching a metal surface with an etching solution comprising an oxidizing ion to provide an etched metal surface, coating at least a portion of the etched metal surface with a liquid composition comprising a polymer, a prepolymer and a crosslinking agent, or a combination thereof to provide a polymeric coating on the etched metal surface; and drying or curing the polymeric coating to form a coated metal surface. The oxidizing ion may comprise Ce(IV), Ag(II), Co(III), or any combination thereof. In any of the foregoing or following embodiments, the metal surface may comprise a stainless steel alloy, a carbon steel alloy, an iron alloy, a cobalt alloy, a nickel alloy, a titanium alloy, an aluminum alloy, a nickel-based superalloy, a cobalt-based superalloy, a high-entropy alloy, or any combination thereof. In some embodiments, the metal surface is a surface of a metal glove box, a metal pipe, a metal storage vessel, a metal ship hull, a metal bridge, a metal building, or a metal windmill blade.

In any of the foregoing or following embodiments, the liquid composition may comprise a fluoropolymer, a silicone, a polymer comprising a metal-binding component, a semi-crystalline polymer, a copolymer comprising metal-binding monomers and monomers that form crystalline regions when the polymer is dried or cured, a combination of a metal-binding component and a semi-crystalline polymer, or any combination thereof.

In any of the foregoing or following embodiments, coating at least a portion of the etched metal surface with a liquid composition may comprise applying the liquid composition on the etched metal surface with a brush, spraying the liquid composition onto the etched metal surface, flowing the liquid composition across the etched metal surface, dipping the etched metal surface into the liquid composition, or spin-coating the liquid composition onto the etched metal surface. In some embodiments, coating at least a portion of the etched metal surface with a liquid composition comprises applying one or more layers of the liquid composition.

In any of the foregoing or following embodiments, (i) an average root mean square (RMS) roughness of the metal surface prior to etching may be 0.5 μm to 2 μm; or (ii) an average RMS roughness of the etched metal surface may be 4 μm to 6 μm; or (iii) both (i) and (ii). In any of the foregoing or following embodiments, a single layer of the polymeric coating, after drying or curing, may have an average thickness of 20 μm to 60 μm. In any of the foregoing or following embodiments, the coated metal surface may have an average coefficient of friction $\mu \leq 0.7$ over 500 cycles with a stainless steel ball and an applied force of 5N.

In any of the foregoing or following embodiments, the liquid composition may further comprise a plurality of nanoparticles. In some implementations, the nanoparticles comprise silicon carbide, carbon nanotubes, tungsten, tungsten carbide, graphene, graphene oxide, $SiO_2$, copper, or any combination thereof. In some embodiments, (i) a concentration of the nanoparticles in the liquid composition is greater than 0 mg/mL and up to 2.5 mg/mL; or (ii) a concentration of the nanoparticles in the coating, after drying or curing, is greater than 0 wt % and up to 10 wt %; or (iii) both (i) and (ii). In certain embodiments, the polymeric coating has a composition gradient with a first average nanoparticle concentration (NP1) at a first average distance from the metal surface and a second average nanoparticle concentration (NP2) at a second, further average distance from the metal surface, wherein NP2>NP1.

The foregoing and other objects, features, and advantages of the invention will become more apparent from the following detailed description, which proceeds with reference to the accompanying figures.

BRIEF DESCRIPTIONS OF THE DRAWINGS

Figure 10A:
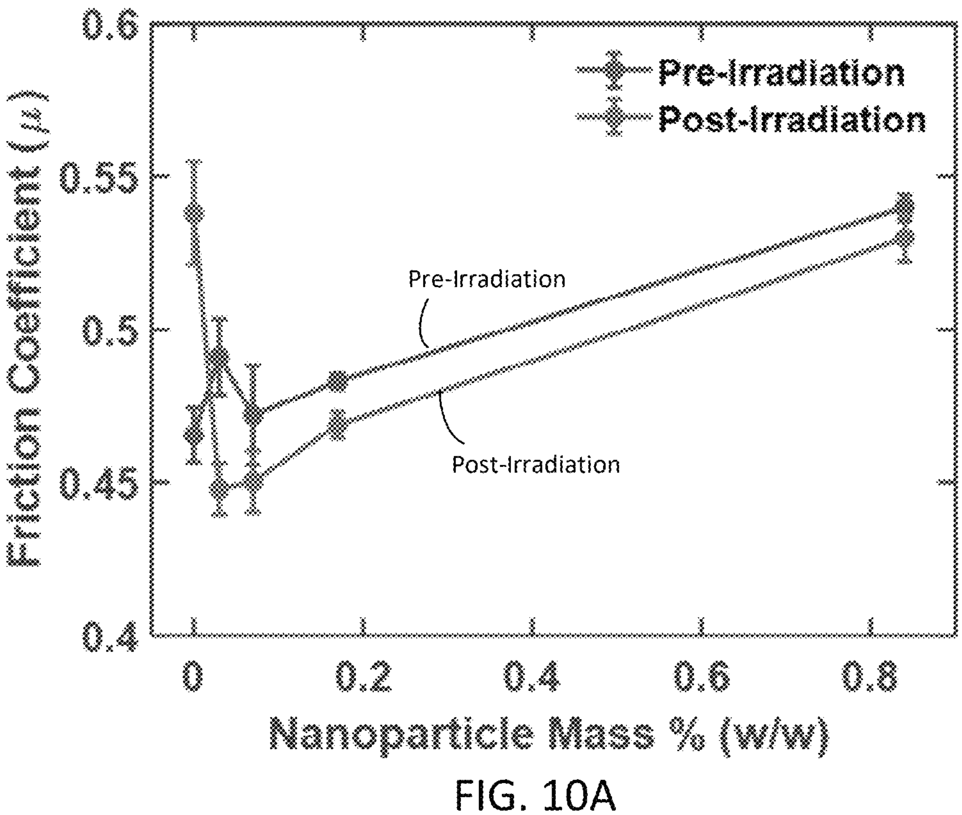
Figure 10B:
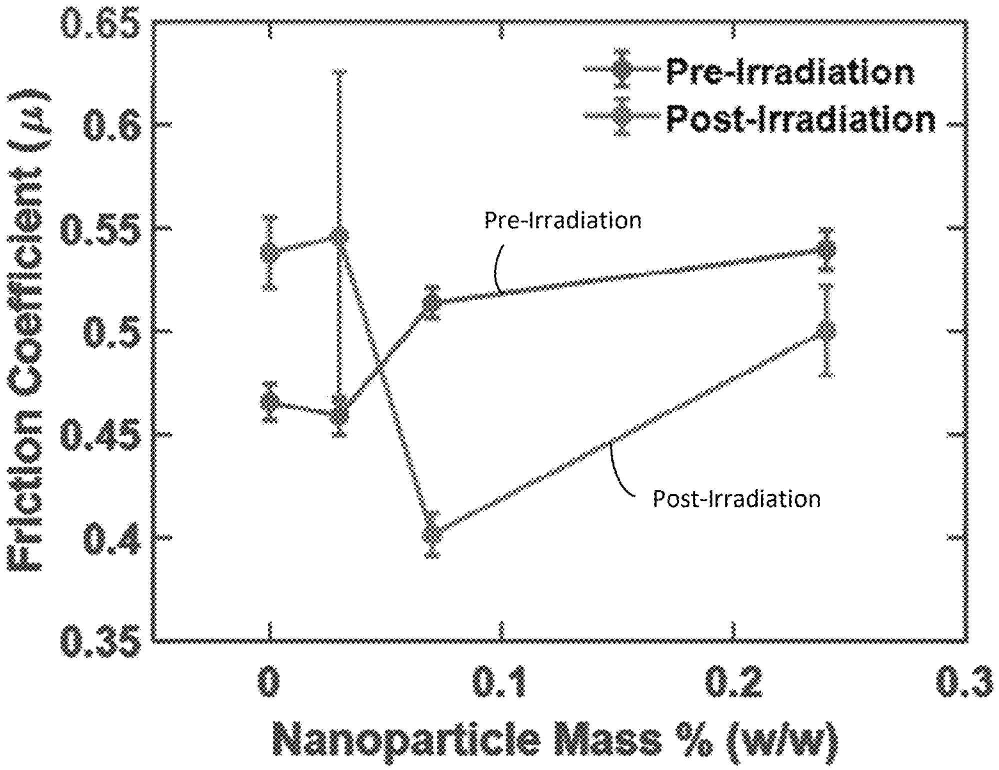

FIGS. 10A-10B are graphs showing average friction coefficients of coatings comprising an embodiment of a polymeric composition comprising silicon carbide nanoparticles (10A) or multi-walled carbon nanotubes (10B) before and after exposure to a dose of gamma radiation and then subjected to a nano-scratch test with an applied load of 100 μN; the results are an average three separate scratches on the same sample.

Figure 11:
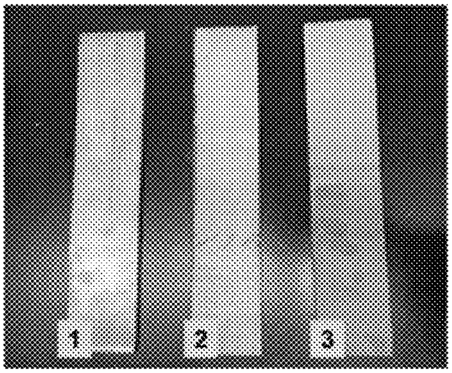

FIG. 11 is a photograph showing stainless steel substrates with a smooth surface (1), rough surface (2), and etched, very rough surface (3).

Figure 12:
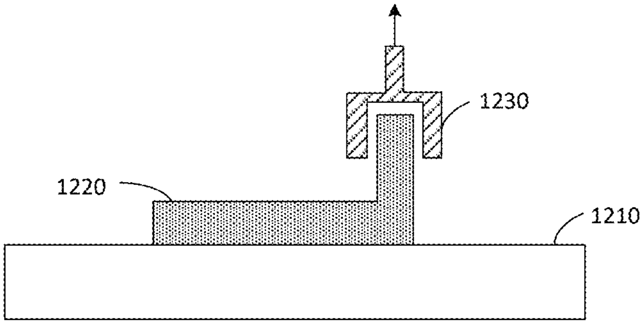

FIG. 12 is a schematic diagram illustrating a 90° peel-off test set-up.

Figure 13:
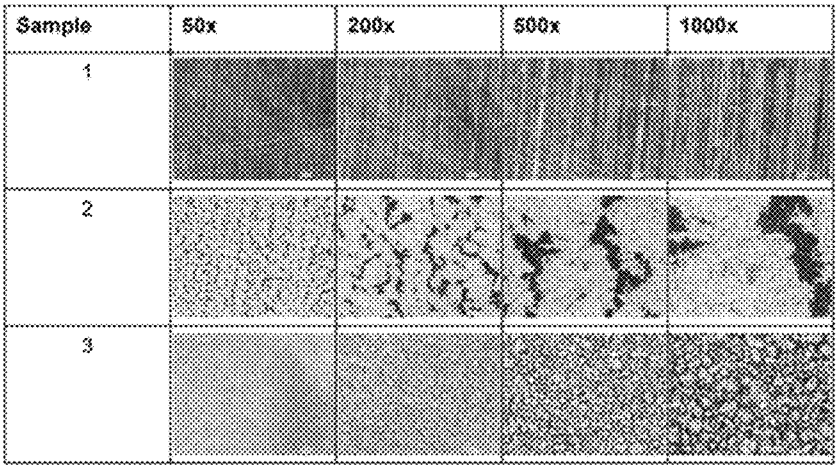

FIG. 13 is surface micrographs of the stainless steel substrates of FIG. 11 at 50×, 200×, 500×, and 1000× magnification.

Figure 14A:
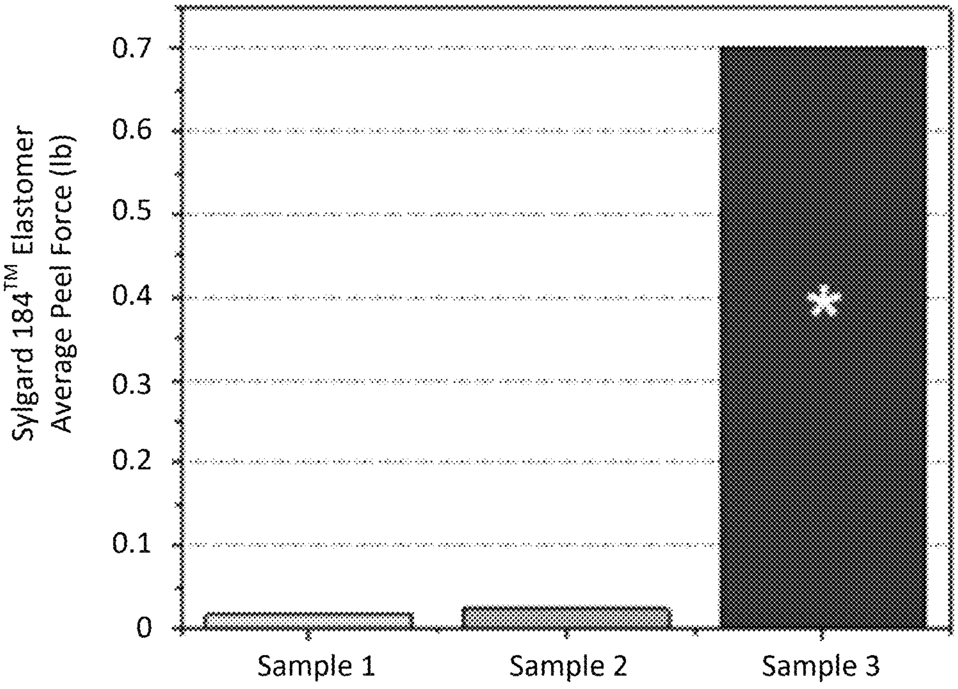
Figure 14B:
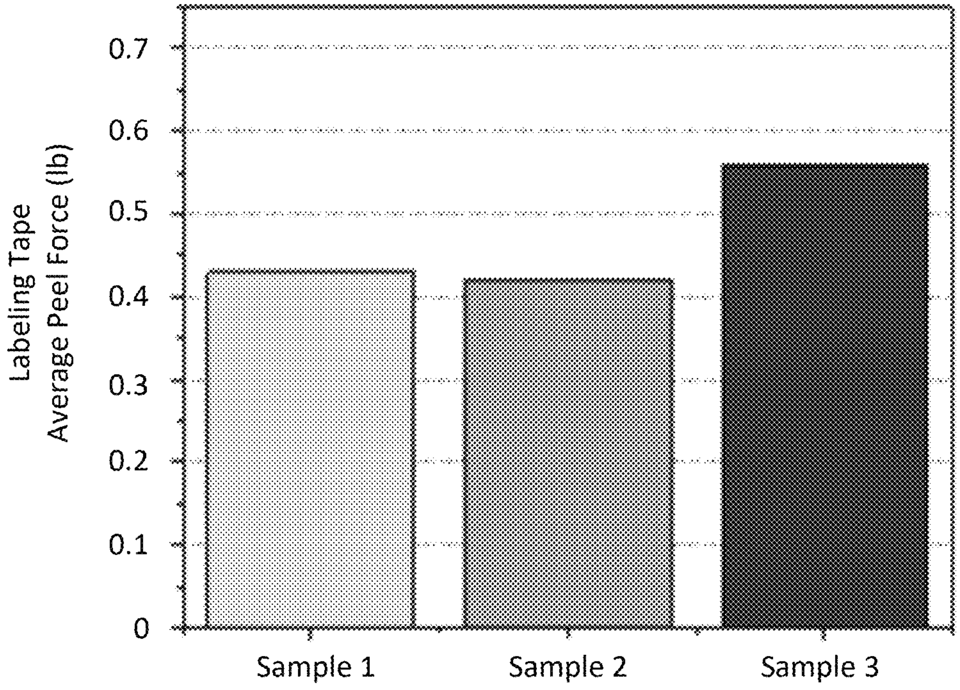

FIGS. 14A and 14B are graphs showing the average peel force measurements to remove Sylgard 184™ elastomer (14A) or labeling tape (14B) from the substrates of FIG. 13.

Figure 15:
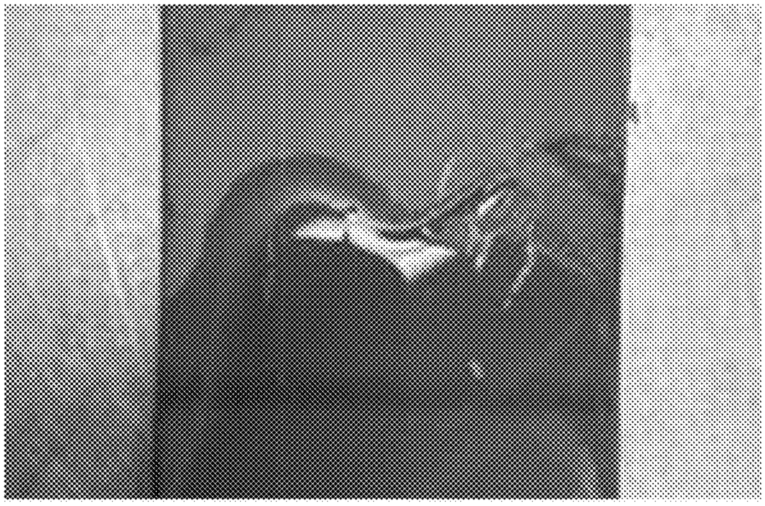

FIG. 15 is a photograph showing that the Sylgard 184™ elastomer broke before peeling off the etched substrate 3.

Figure 16:
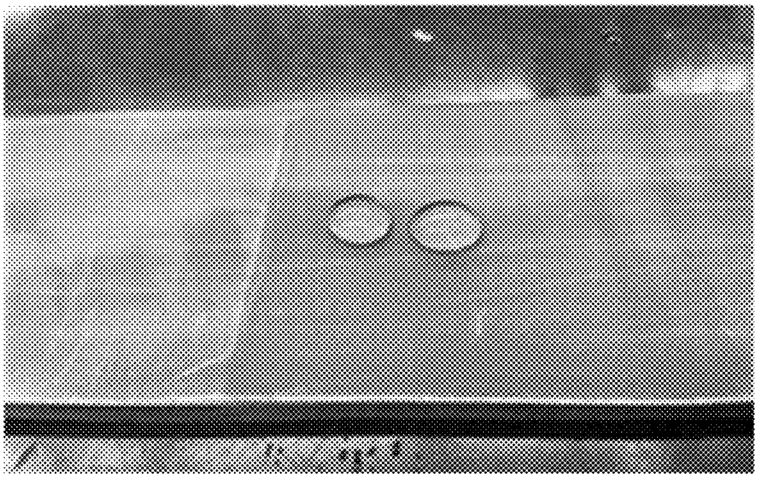

FIG. 16 is a photograph showing that attempts to remove the Sylgard 184™ elastomer thin film left a thin hydrophobic coating on the substrate.

DETAILED DESCRIPTION

This disclosure concerns embodiments of a method for etching a metal surface and applying a polymeric coating to the etched metal surface. In some embodiments, the polymeric coating further comprises a plurality of nanoparticles. In certain embodiments, the polymeric composition provides a coating with desirable chemical and/or mechanical properties including, but not limited to, corrosion resistance, radiation resistance, wear resistance, chemical resistance, and/or a low friction coefficient. Embodiments of the disclosed method provide coated metal surfaces with increased resistance to corrosion, wear, irradiation, salt water, acids, and the like, and/or a reduced coefficient of friction (COF) compared to an uncoated metal surface.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Alloy: A metal made by melting and mixing two or more different metals. For example, a nickel alloy is a metal made by combining nickel and at least one other metal. In some embodiments, an alloy is a solid solution of metal elements.

Coefficient of friction (COF): A dimensionless value describing the ratio of force of friction between two bodies and the force pressing them together. COF may be represented by the Greek letter μ. As used herein, COF refers to kinetic (or sliding) COF in which the surfaces are in relative motion.

Crosslinking or curing agent: A compound that participates in a chemical reaction between an oligomer, prepolymer, and/or polymer to facilitate polymerization.

Metal-binding component: A component comprising moieties that form a coordination complex with metal cations or metal atoms. Exemplary moieties include, but are not limited to, benzotriazoles, pyridines, phenanthrolines, hydroxyquinolines, carboxylates, imidazolylmethyl groups, and combinations thereof. The metal-binding component may comprise small molecules or it may be a polymer. One exemplary metal-binding component is 1,2,3-benzotriazole. The benzotriazole molecules bind to a metal surface, e.g., a stainless steel surface, and may form physical conjugates with other molecules (e.g., semi-crystalline polymer molecules) comprising aryl rings by pi-pi stacking.

Polymer: A molecule of repeating structural units (e.g., monomers) formed via a chemical reaction, i.e., polymerization.

Prepolymer: A monomer or combination of monomers that have been reacted to an intermediate state, e.g., oligomers having a small number (e.g., 2-100, more commonly 2-30) of monomers.

Semi-crystalline polymer: A polymer having chains that form lamellae—stacked ordered arrangements of thin layers or plate-like structures—when the polymer is dried. Semi-crystalline polymers typically have crystalline regions and amorphous regions with varying degrees of crystallinity, e.g., 10-80% crystalline. Crystallinity may be determined by several methods, including differential scanning calorimetry, x-ray diffraction, infrared spectroscopy, nuclear magnetic resonance spectroscopy, transmission electron microscopy, and polarized light microscopy. Semi-crystalline polymers may include syndiodactic or syntactic (pendant groups on alternating sides of the chain) and/or isotactic (pendant groups on the same side of the chain) groups. In some embodiments, the semi-crystalline polymer includes a plurality of rings, e.g., a plurality of phenyl rings. One exemplary semi-crystalline polymer is polydiphenylsiloxane.

Stainless steel: An alloy comprising iron and chromium. Stainless steel alloys typically also include at least trace, and in some cases significant, amounts of one or more other elements including, but not limited to, carbon, nickel, manganese, molybdenum, silicon, phosphorus, nitrogen, sulfur, aluminum, arsenic, antimony, bismuth, cobalt, copper, niobium, selenium, tantalum, titanium, tungsten, vanadium, or combinations thereof.

Superalloy: As used herein, the term "superalloy" refers to a nickel- or cobalt-based alloy with a face-centered cubic (austenitic) structure.

II. Process for Preparing Corrosion-Resistant Metal Surfaces

Embodiments of a method for etching a metal surface and applying a polymeric coating to the etched metal surface are disclosed. In some embodiments, the polymeric coating further comprises a plurality of nanoparticles.

The method comprises etching a metal surface with an etching solution comprising an oxidizing ion provide an etched metal surface; coating at least a portion of the etched metal surface with a liquid composition comprising a polymer, a prepolymer and a crosslinking agent, or a combination thereof; and drying the coating to form a coated metal surface. In any of the foregoing or following embodiments, the oxidizing ion may comprises Ce(IV), Ag(II), Co(III), or any combination thereof. In some embodiments, a concentration of the oxidizing ion in the etching solution is 0.1 M to 1 M, such as 0.15 M to 0.8 M, or 0.2 M to 0.7 M. In any of the foregoing or following embodiments, the etching solution may be prepared by preparing an acidic solution of an oxidizable ion, e.g., an acidic solution of Ce(III), Ag(I), Co(II), or any combination thereof, and applying a potential to the acidic solution, wherein the potential is effective to oxidize at least some of the oxidizable ion. In some embodiments, the acidic solution comprises 3 N to 10 N acid, such as 3 M to 10 M $HNO_3$. In some examples, the acidic solution comprised 0.15 M to 1 M Ce(III) in 6 M $HNO_3$. Ce(III) may be oxidized to Ce(IV) with a potential ≥1.6V, e.g., a potential of 1.8V to 2.0V.

In any of the foregoing or following embodiments, etching the metal surface with the oxidizing ion may comprising contacting the metal surface with the etching solution for a period of time effective to remove metal from the metal surface. In some embodiments, metal is removed between grain boundaries, thereby increasing surface area and/or surface roughness. In certain implementations, metal may be removed to a depth of 0.5 μm to 10 μm, such as to a depth of 1 μm to 5 μm, in regions between grain boundaries.

In any of the foregoing or following embodiments, etching the metal surface with the oxidizing ion may comprising contacting the metal surface with the etching solution for a period of time effective to remove at least 75% of contaminants from the metal surface. In some embodiments, the contaminants comprise metal oxides (e.g., from metal oxide deposition or metal surface oxidation), salts, grease, oil, or any combination thereof. In one embodiment, etching is performed for a period of time effective to remove at least 50%, at least 75%, at least 80%, at least 90%, or at least 95%, such as 75-100%, 80-100%, 90-100%, or 95-100% of contaminants from the metal surface. The period of time may be from 10 minutes to 48 hours, such as from 30 minutes to 40 hours, 1 hour to 36 hours, 6 hours to 30 hours, or 12 hours to 24 hours. Etching may be performed at any temperature from ambient temperature to a temperature below the boiling point of the etching solution. In some embodiments, etching is performed at a temperature of 20° C. to 75° C., such as 40° C. to 60° C. One exemplary etching reaction is the oxidation and dissolution of a $Cr_2O_3$ passive layer on stainless steel with an etching solution comprising $Ce^{4+}$:

$$2Cr_2O_{3\,(s)}+4Ce^{4+}_{(aq)}\rightarrow Cr_2O_7{}^{2-}_{(aq)}+4Ce^{3+}_{(aq)}\sim 1.24V$$

In any of the foregoing or following embodiments, an average root mean square (RMS) roughness of the metal surface prior to etching may be 0.5 μm to 2 μm. In some embodiments an average RMS roughness of the etched metal surface is 4 μm to 6 μm. The increased roughness of the surface topology increases the surface area, improves surface wettability, and improves adhesion of the subsequent polymer coating to the metal surface.

At least a portion of the etched metal surface is coated with a liquid composition comprising a polymer, a prepolymer and crosslinking (or curing) agent, or a combination thereof to form a polymeric coating. In one embodiment, the liquid composition comprises a polymer and a solvent. In another embodiment, the liquid composition comprises a prepolymer and a crosslinking agent. The polymeric coating is dried or cured to form a coated metal surface. In any of the foregoing or following embodiments, the liquid composition, and resulting polymeric coating, may comprise a fluoropolymer, a silicone (e.g., a polydialkylsiloxane, such as polydimethylsiloxane), a polymer comprising a metal-binding component, a semi-crystalline polymer, a copolymer comprising metal-binding monomers and monomers that form crystalline regions when the polymer is dried or cured, a combination of a metal-binding component and a semi-crystalline polymer, or any combination thereof.

In one embodiment, the liquid composition comprises a fluoropolymer. In certain implementations, the fluoropolymer is polytetrafluoroethylene (PTFE), polyvinylidene fluoride (PVDF), a perfluoroalkoxy alkane (PFA, e.g., a copolymer of (i) tetrafluoroethylene or hexafluoropropylene and (ii) a perfluoroether ($C_2F_3OR^f$ where $R^{f-}$ is a perfluorinated alkyl, such as trifluoromethyl)), or any combination thereof.

In some embodiments, the liquid composition comprises a metal-binding component and a semi-crystalline polymer, or a copolymer comprising metal-binding monomers and monomers that form crystalline regions when the polymer is dried or cured. In certain embodiments, the liquid composition may further include a third polymer, e.g., a polyacrylate. In some examples, the metal-binding component, or metal-binding monomer, comprises moieties that form a coordination complex with metal cations or atoms. Exemplary moieties include benzotriazoles, pyridine phenanthrolines, hydroxyquinolines, carboxylates, imidazolylmethyl groups, and combinations thereof. The semi-crystalline polymer comprises chains that form lamellae when the polymer is dried. Lamellae may be formed, for example, by stacked chains and/or layered side-chain rings. Exemplary semi-crystalline polymers include, but are not limited to, polymers of monomers comprising phenyl groups (e.g., vinyl benzene, diphenylsiloxane), polypropylene, polyethylene, polyamides (e.g., formed from amine and carboxylic acid monomers), and combinations thereof. In certain examples, the liquid composition includes a polydiphenylsiloxane, a polybenzotriazole, benzotriazole molecules, a copolymer comprising diphenylsiloxane and benzotriazole monomers, or any combination thereof. The liquid composition may further include an additional polymer, such as a polyacrylate. The solvent is any solvent in which the polymers are soluble.

In any of the foregoing or following embodiments, the liquid composition may further comprise a plurality of nanoparticles. Suitable nanoparticles include, but are not limited to, carbon nanoparticles, carbide nanoparticles, metal nanoparticles, and metal or metalloid oxide nanoparticles. In some embodiments, the nanoparticles comprise silicon carbide, carbon nanotubes (single- or multi-walled carbon nanotubes), tungsten, tungsten carbide, graphene, graphene oxide, $SiO_2$, silver, copper, or any combination thereof. In some examples, the nanoparticle composition may be selected to impart different properties to the coating. For instance, some nanoparticles may improve mechanical, electrical, and/or optical properties of the coating. For example, carbon nanotubes and graphene are light and strong materials of great interest for a wide range of applications including, but not limited to, photovoltaics, nanoelectronics, charge-dissipation coating, and bio nano-medicine. In another example, Si-based nanoparticles, such as SiC, provide excellent friction, wear and corrosion properties in abrasive and harsh chemical environments. In some embodiments, the liquid composition may include a plurality of different nanoparticles. For instance, a combination of SiC nanoparticles and carbon nanotubes may enhance sliding wear resistance of the coating. In another example, a combination of carbon nanotubes and graphene may provide the coating with superior elastoplastic properties. In any of the foregoing or following embodiments, the nanoparticle surfaces may be functionalized to provide better incorporation or dispersion into the liquid composition. In any of the foregoing or following embodiments, a concentration of nanoparticles in the liquid composition may be greater than 0 mg/mL and up to 10 mg/mL, such as 0.1 mg/mL to 5 mg/mL, or 0.2 mg/mL to 2.5 mg/mL. In some embodiments a concentration of nanoparticles in the coating, after drying, is greater than 0 wt % and up to 10 wt %, such as 0.01 wt % to 10 wt %, 0.1 wt % to 5 wt %, or 0.2 wt % to 2 wt %.

In any of the foregoing or following embodiments, coating the etched metal surface with the liquid composition may be performed by any suitable method. In some embodiments, coating comprises applying the liquid composition on the etched metal surface with a brush, spraying the liquid composition onto the etched metal surface, flowing the liquid composition across the etched metal surface, dipping the etched metal surface into the liquid composition, spin-coating the liquid composition onto the etched metal surface, or blade-coating the liquid composition onto the etched metal surface. In one embodiment, flowing the liquid composition across the etched metal surface comprises injecting the liquid composition into a pipe having an inner metal surface. In an independent embodiment, dipping the etched metal surface into the liquid composition comprises immersing a metal component comprising the etched metal surface into the liquid composition. The metal component may be, for example, immersed in a circulating bath of the liquid composition.

One or more layers of the liquid composition are applied to the etched metal surface to form a polymeric coating. In one embodiment, a single layer of the liquid composition is applied. In some embodiments, a plurality of layers is applied. In certain examples, from 2-10 layers, such as 2-8, 2-6, or 2-5 layers, of the liquid composition are applied to form the polymeric coating.

The polymeric coating is dried or cured to form a coated metal surface. In the dried or cured polymeric coating wherein the liquid composition comprises a metal-binding component and a semi-crystalline polymer (or a copolymer comprising metal-binding monomers and monomers that form crystalline regions), the metal-binding component adheres to the metal surface, and the semi-crystalline polymer (or crystalline region) provides the coating with crystalline characteristics and wear-resistant properties. When a plurality of layers of the liquid composition is applied to the etched metal surface, each layer may be dried or cured before a subsequent layer is applied. The metal-binding component of the first layer adheres to the metal surface, and the semi-crystalline polymer (or crystalline regions) of the first and subsequent layers provides the crystalline characteristics and wear-resistant properties. The polymeric coating may be allowed to dry or cure at ambient (e.g., 20-30° C.) temperature. Alternatively, the polymeric coating, or a metal component comprising the polymeric coating, is heated to dry or cure the polymeric coating. Heating may be performed at a time and temperature sufficient to remove all or substantially all (e.g., at least 90 wt %) of the solvent from the liquid composition. In some embodiments, the polymeric coating is heated at a temperature from 50° C. to 250° C., such as 60° C. to 200° C., 100° C. to 200° C., or 125° C. to 175° C. Advantageously, the temperature is high enough to facilitate solvent evaporation, but below a temperature at which one or more of the polymers thermally degrades. In certain examples, the polymeric coating was heated at 150° C. In some embodiments, the drying or curing time is from 10 minutes to 2 hours, such as from 30 minutes to 100 minutes, or 30 minutes to 60 minutes. A person of ordinary skill in the art understands that the drying time may decrease as the drying temperature increases. In some examples, each layer of the coating is dried or cured at 150° C. for 30 minutes.

In any of the foregoing or following embodiments where the liquid composition further comprises a plurality of nanoparticles, the plurality of nanoparticles may form a composition gradient throughout the dried coating with a higher concentration of nanoparticles near an upper surface of the dried or cured coating. In some embodiments, the coating has a composition gradient with a first average nanoparticle concentration (NP1) at a first average distance from the metal surface and a second average nanoparticle concentration (NP2) at a second, further average distance from the metal surface, wherein NP2>NP1 (see, e.g., FIG. 8). Presence of a nanoparticle composition gradient can be determined, for example, by cross-sectional scanning electron microscopy or focused ion beam-scanning electron microscopy.

In any of the foregoing or following embodiments, each layer of the coating, after drying or curing, may have an average thickness of 20 μm to 60 μm, such as an average thickness of 20 μm to 50 μm, 20 μm to 40 μm, or 30 μm to 40 μm. In any of the foregoing or following embodiments, the coated metal surface may have an average coefficient of friction (COF, μ) 0.8, such as an average COF of ≤0.7, 0.4-0.8, 0.4-0.7, or 0.4-0.6, over 500 cycles with a stainless steel ball and an applied force of 5N. In some embodiments, the coated metal surface has a top interface (uppermost surface) COF of 0.05-0.15, and a bulk surface COF of 0.4-0.7. Without wishing to be bound by a particular theory of operation, when the coating comprises nanoparticles, segregation of nanoparticles to the uppermost surface may disrupt the cross-linking network, with the nanoparticles then acting as lubricants to reduce the COF. As the surface is removed away through repeated wear, the bulk material comprises primarily cross-linked polymer with a lower nanoparticle concentration, resulting in a larger COF.

Suitable metals for use in any of the foregoing embodiments include, but are not limited to, steels (e.g., stainless steel, carbon steel), iron alloys (e.g., iron-nickel, iron-chromium-nickel-molybdenum), cobalt alloys, nickel alloys (e.g., nickel-chromium alloys), titanium alloys, aluminum alloys, (e.g., bronze), nickel-based superalloys, cobalt-based superalloys, high-entropy alloys (alloys including five or more elements in equal or similar proportions), or any combination thereof. In some embodiments, the metal is a steel. In certain embodiments, the metal is an austenitic stainless steel.

Common stainless steel types include austenitic, ferritic, and martensitic stainless steels, which have differing crystal structures. Austenitic stainless steels have a face-centered cubic crystal structure, a minimum of 16% (w/w) chromium, and contain sufficient nickel and/or manganese to stabilize the austenite structure. A common austenitic stainless steel is type 304 with 18% (w/w) chromium and 8% (w/w) nickel. Austenitic stainless steels are not hardenable by heat treatment, and are not magnetic. Stainless steel 304H comprises 0.04-0.1 wt % carbon, up to 2 wt % manganese, up to 0.045 wt % phosphorus, up to 0.03 wt % sulfur, up to 0.75 wt % silicon, 18-20 wt % chromium, 8-10.5 wt % nickel, up to 0.1 wt % nitrogen, with the balance (~66.5-74 wt %) being iron. Stainless steel 304L comprises up to 0.03 wt % carbon, up to 2 wt % manganese, up to 0.045 wt % phosphorus, up to 0.03 wt % sulfur, up to 0.75 wt % silicon, 18-20 wt % chromium, 8-12 wt % nickel, up to 0.1 wt % nitrogen, with the balance (~65-74 wt %) being iron. Stainless steel 316L comprises up to 0.03 wt % carbon, up to 2 wt % manganese, up to 0.75 wt % phosphorus, up to 0.03 wt % sulfur, 16-18 wt % chromium, 2-3 wt % molybdenum, 10-14 wt % nickel, up to 0.1 wt % nitrogen with the balance (~62-72 wt %) being iron.

Ferritic stainless steels have a body-centered cubic crystal structure, typically 10.5-27% (w/w) chromium, and little or no nickel; several ferritic stainless steels also include molybdenum. Ferritic stainless steels have reduced corrosion resistance compared to austenitic stainless steels, and are ferromagnetic. Ferritic stainless steels are not hardenable by heat treatment.

Martensitic stainless steels have a body-centered tetragonal crystal structure, less than 20% (w/w) chromium, and less than 6% (w/w) nickel. They may include up to 1.2% (w/w) carbon. Martensitic stainless steels may include trace amounts (e.g., ≤1% (w/w)) of other elements including, but not limited to, silicon, manganese, phosphorus, sulfur, molybdenum, niobium, tungsten, vanadium, nitrogen, copper, selenium, or combinations thereof. Martensitic stainless steels are less corrosion resistant than austenitic and ferritic stainless steels, but are extremely strong, highly machinable, and can be hardened by heat treatment. Martensitic stainless steels are ferromagnetic.

Carbon steel is an alloy comprising iron and carbon (typically 0.4-2.5 wt % carbon). Carbon steel alloys may further include manganese (up to 1.65 wt %), silicon (up to 0.6 wt %), copper (up to 0.6 wt %), or combinations thereof.

Exemplary nickel-iron-chromium alloys include, but are not limited to, Incoloy® and Udimet® alloys available from Special Metals Corporation, New Hartford, NY). Incoloy® 800H is a nickel-iron-chromium alloy comprising 30-35 wt % nickel/cobalt (up to 2 wt % cobalt), 19-23 wt % chromium, up to 1 wt % silicon, up to 1.5 wt % manganese, 0.05-0.1 wt % carbon, 0.15-0.6 wt % aluminum, 0.15-0.6 wt % titanium, up to 0.015 wt % sulfur, with the balance (~38-51 wt %) being iron. Incoloy® A-286 is an iron-nickel-chromium alloy with additions of molybdenum and titanium, having a composition comprising 24-27 wt % Ni, 13.5-16 wt % Cr, 1.9-2.35 wt % Ti, 1-1.5 wt % Mo, 0.1-0.5 wt % V, ≤0.08 wt % C, ≤2 wt % Mn, ≤1 wt % Si, ≤0.35 wt % Al, ≤0.03 wt % S, 0.001-0.01 wt % B, with the balance (~49-59.5 wt %) being iron. Udimet® 720 alloy is a nickel-chromium alloy comprising 15.5-16.5 wt % Cr, 14-15.5 wt % Co, 2.75-3.25 wt % Mo, 1-1.5 wt % W, 4.75-5.25 wt % Ti, 2.25-2.75 wt % Al, 0.01-0.02 wt % C, 0.025-0.05 wt % Zr, 0.01-0.02 wt % boron, with the balance (~55.2-59.7 wt %) being nickel. Udimet® R41 is a nickel-chromium alloy comprising 18-20 wt % Cr, 10-12 wt % Co, 9-10.5 wt % Mo, 1.4-1.8 wt % Al, 3-3.3 wt % Ti, ≤5 wt % Fe, 0.003-0.01 wt % B, ≤0.12 wt % C, with the balance (~47.4-58.6 wt %) being nickel.

Exemplary chromium-based and iron-nickel alloys include, but are not limited to, Udimet® alloys (available from Special Metals Corporation, New Hartford, NY). Udimet® 188 alloy is a cobalt-based alloy comprising 0.05-0.15 wt % C, ≤1.25 wt % Mn, 0.2-0.5 wt % Si, 20-24 wt % Cr, 20-24 wt % Ni, 13-16 wt % W, 0.02-0.12 wt % La, ≤0.015 wt % B, ≤3 wt % Fe, with the balance (~31-46.7 wt %) being cobalt. Udimet® D-979 alloy is an iron-nickel alloy comprising 14-16 wt % Cr, 3-4.5 wt % Mo, 3-4.5 wt % W, 2.7-3.3 wt % Ti, 0.75-1.3 wt % Al, 42-48 wt % Ni, ≤0.08 wt % C, ≤0.75 wt % Si, ≤0.75 wt % Mn, 0.008-0.016 wt % B, with the balance (~20.8-34.5 wt %) being iron Nickel-based superalloys include, but are not limited to, Inconel® and Haynes® alloys (available from Haynes International, Inc., Kokomo, IN). Inconel® 718 is a nickel-based superalloy having a composition comprising 50-55 wt % Ni/Co (maximum 1 wt % cobalt), 17-21 wt % Cr, 4.75-5.50 wt % Nb (plus tantalum), 2.8-3.3 wt % Mo, 0.65-1.15 wt % Ti, 0.2-0.8 wt % Al, ≤1 wt % Co, ≤0.08 wt % C, ≤0.35 wt % Mn, ≤0.35 wt % Si, ≤0.015 wt % P, ≤0.015 wt % S, ≤0.006 wt % B, ≤0.3 wt % Cu, with the balance being iron. Inconel® X-750 is a nickel-based superalloy having a composition comprising at least 70 wt % Ni/Co (maximum 1 wt % cobalt), 14-17 wt % Cr, 5-9 wt % Fe, 2.25-2.75 wt % Ti, 0.4-1 wt % Al, 0.7-1.2 wt % Nb (plus tantalum), ≤1 wt % Mn, K 0.5 wt % Si, K 0.01 wt % S, K 0.5 wt % Cu, K 0.08 wt % C, K 1 wt % Co. Haynes® 242® alloy is a nickel-based superalloy having a composition comprising 24-26 wt % Mo, 7-9 wt % Cr, 2.5 wt % Co, 0.8 wt % Mn, 0.8 wt % Si, 0.5 wt % Al, 0.5 wt % Cu, K 0.03 wt % C, and ≤0.006 wt % B, with the balance (~65 wt %) being nickel. Haynes®

282 alloy is a nickel-based superalloy having a nominal composition comprising 8.5 wt % Mo, 20 wt % Cr, 10 wt % Co, K 0.3 wt % Mn, K 0.15 wt % Si, 1.5 wt % Al, ≤1.5 wt % Fe, 0.06 wt % C, and 0.005 wt % B, with the balance (~57 wt %) being nickel. Haynes® Waspaloy alloy is a nickel-based superalloy having a composition comprising 18-21 wt % Cr, 12-15 wt % Co, 3.5-5 wt % Mo, 2.75-3.25 wt % Ti, 1.2-1.6 wt % Al, 0.03-0.1 wt % C, 0.02-0.08 wt % Zr, 0.003-0.01 wt % B, ≤2 wt % Fe, ≤0.15 wt % Si, ≤0.1 wt % Cu, ≤0.1 wt % Mn, ≤0.015 wt % P, and ≤0.015 wt % S, with the balance being nickel. Udimet® 520 alloy is a nickel-based superalloy comprising 0.02-0.06 wt % C, 18-20 wt % Cr, 11-14 wt % Co, 5.5-7 wt % Mo, 2.9-3.25 wt % Ti, 1.8-2.3 wt % Al, 0.8-1.2 wt % W, 0.004-0.010 wt % B, with the balance being nickel.

Cobalt-based superalloys include, but are not limited to Haynes® and Ultimet® alloys (available from Haynes International, Inc., Kokomo, IN), and Udimet® alloys (available from Special Metals Corporation, New Hartford, NY). Haynes® 25 is a cobalt-based superalloy comprising 51 wt % Co, 10 wt % Ni, ≤3 wt % Fe, 20 wt % Cr, 15 wt % W, 1.5 wt % Mn, ≤0.4 wt % Si, and 0.1 wt % C. Ultimet® alloy is a cobalt superalloy having a composition comprising 26 wt % Cr, 9 wt % Ni, 5 wt % Mo, 3 wt % Fe, and 2 wt % W, with the balance (~55 wt %) being cobalt (available from Haynes International, Inc., Kokomo, IN). Udimet® L-605 alloy is a cobalt-based superalloy comprising 0.05-0.15 wt % C, 1-2 wt % Mn, ≤0.4 wt % Si, 19-21 wt % Cr, 9-11 wt % Ni, 14-16 wt % W, ≤0.04 wt % P, ≤0.03 wt % S, ≤3 wt % Fe, with the balance being cobalt (available from Special Metals Corporation, New Hartford, NY).

Embodiments of the disclosed method are useful for protecting metal surfaces for many components and uses. Some non-limiting examples include a surface of a metal glove box, a metal pipe, a metal storage vessel, a metal ship hull, a metal bridge, a metal building, or a metal windmill blade. In one example, surfaces of a metal glove box are etched and coated to increase cleanability and long-term service life of the glovebox. In another example, the surface of a ship hull may be etched and coated to reduce corrosion and drag due to salt water contact and/or barnacles adhering to the hull. In still another example, steel surfaces on infrastructure (e.g., bridges, buildings, dams, or the like) may be etched and coated to resist wear and corrosion from exposure to the elements and/or salt water. In yet another example, inside surfaces of a metal storage vessel may be etched and coated to resist wear and corrosion from contents (e.g., acids, abrasive particles) stored therein.

III. Examples

Example 1

Electrochemical Metal Surface Etching

An electrolytic cell includes a solution comprising cerium (III) nitrate in 6 M nitric acid. The cell potential is set above the Ce(III)/Ce(IV) 1.6V oxidation potential, such that:

$$\text{Ce(III)}\rightarrow\text{Ce(IV)}+e^-\sim 1.6\text{V}$$

A contaminated metal component (e.g., 316 stainless steel, 304L stainless steel, iridium) is contacted with the Ce(IV) solution. In some examples, the metal component is contaminated with $PuO_2$. The high potential of the Ce(IV) oxidizes and dissolves the $PuO_2$ contaminant, and also dissolves the $Cr_2O_3$ passive layer of stainless steel:

$$PuO_{2\,(s)}+2Ce^{4+}_{(aq)}\rightarrow PuO_2^{2+}{}_{(aq)}+2Ce^{3+}_{(aq)}\sim 1.5\text{V}$$

$$2Cr_2O_{3\,(s)}+4Ce^{4+}_{(aq)}\rightarrow Cr_2O_7^{2-}{}_{(aq)}+4Ce^{3+}_{(aq)}\sim 1.24\text{V}$$

Figure 1:
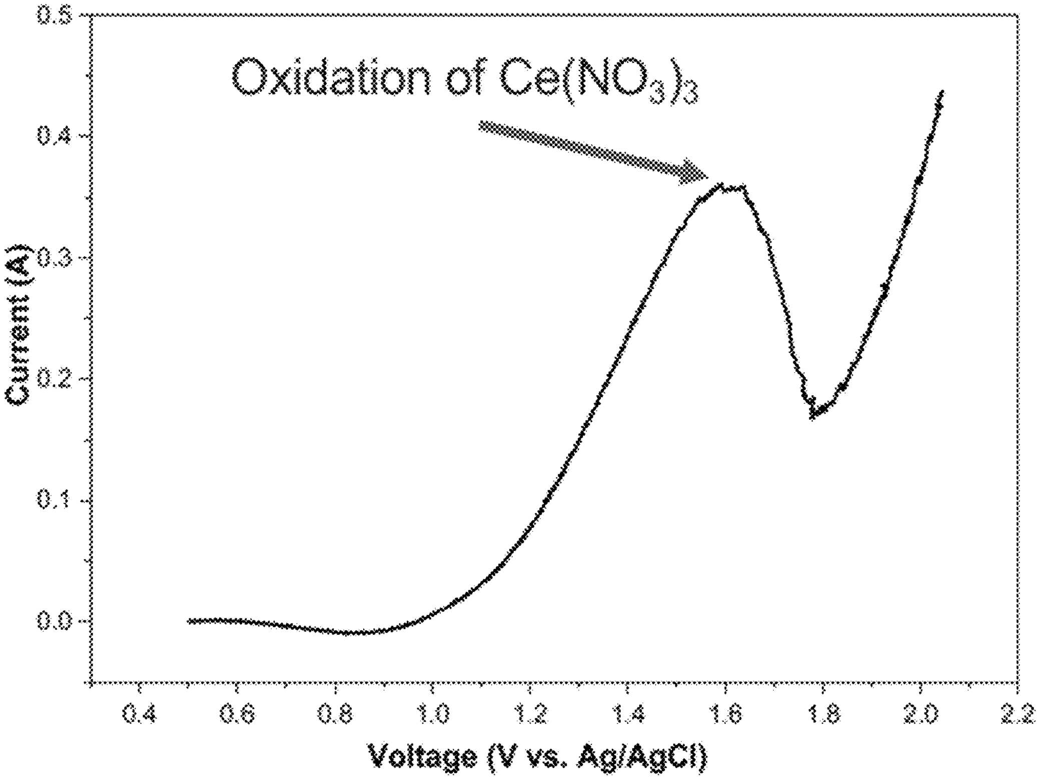
FIG. 1 is a graph showing oxidation of $Ce(NO_3)_3$ to $Ce(NO_3)_4$ as voltage increased.
Figure 2:
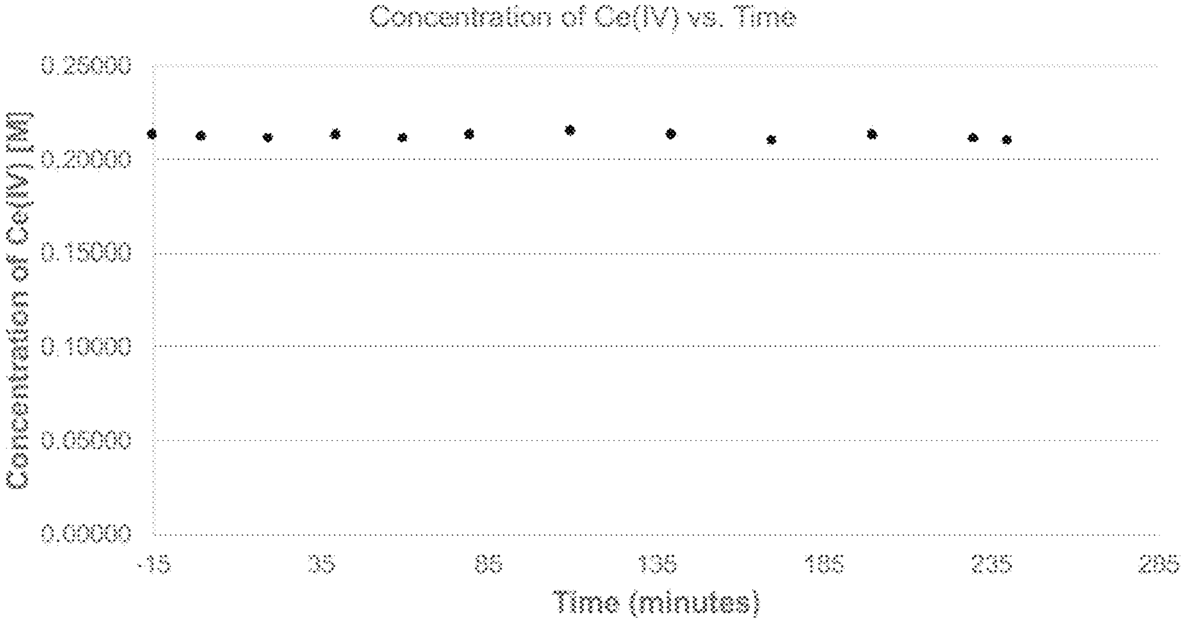
FIG. 2 is a graph showing stability of the oxidized $Ce(NO_3)_4$ over time using the electrochemical cell to maintain a constant concentration.

In one example, normal pulse voltammetry was used to determine that the oxidation potential of $Ce(NO_3)_3$ to $Ce^{4+}$ was ~1.6V (FIG. 1). At potentials above 2V, the electrolyte was broken down more rapidly. The $Ce^{4+}$ was stable in the electrolyte solution. The largest change in concentration over a 4-hour period was only 1.8% (FIG. 2). The electrolytic flow cells demonstrated a Ce(IV) generation rate (M/minute) up to y=0.0044x−0008, where y is the Ce(IV) concentration and x is minutes.

Figures 3A, 3B:
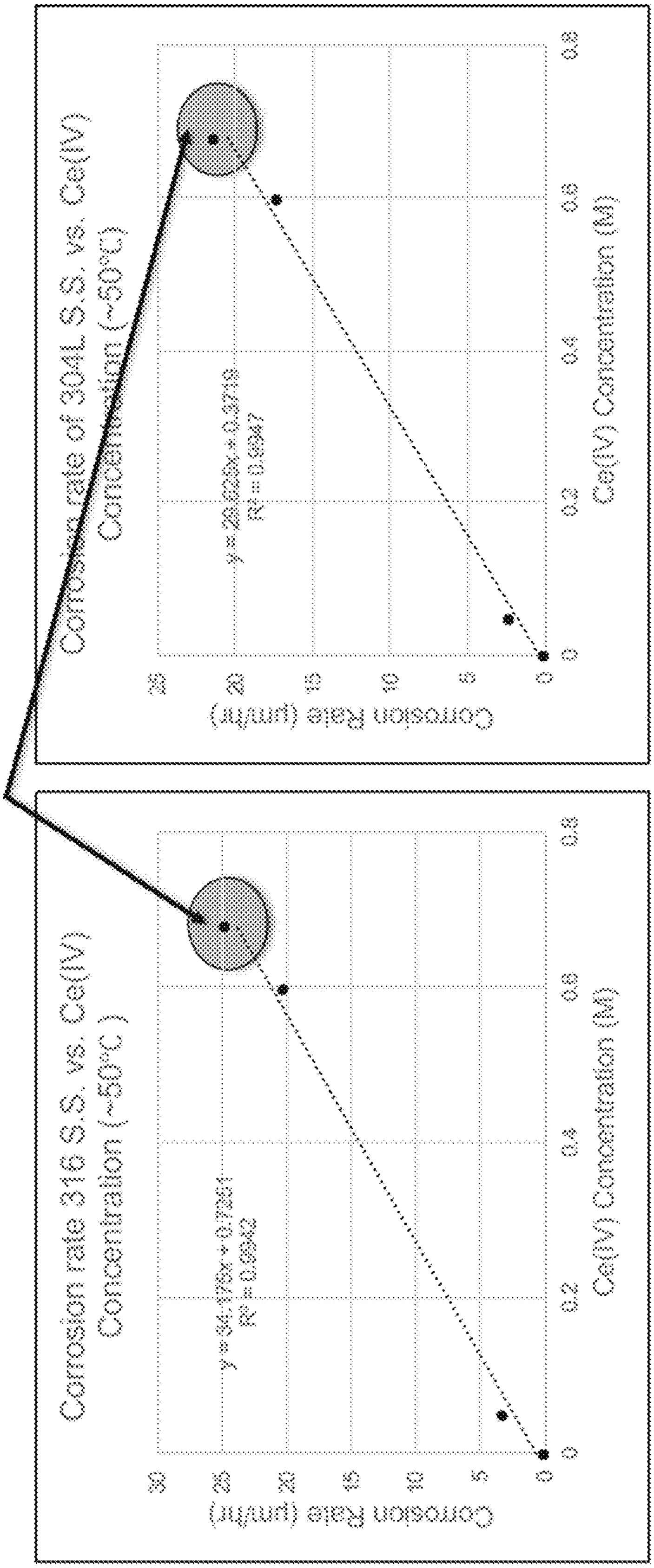
FIGS. 3A and 3B are graphs showing the corrosion rate of 316 stainless steel (3A) and 304 stainless steel (3B) as a function of $Ce^{4+}$ concentration at ~50° C.

Stainless steel coupons were immersed in a circulating bath of electrolytes with varying concentration from 0-0.7 M $Ce^{4+}$. Electrolysis was performed at a potential of +1.8-2.0V to produce $Ce^{4+}$ and prevent electrolyte breakdown. FIGS. 3A and 3B show the corrosion rates of 316 stainless steel (3A) and 304 stainless steel (3B) at varying $Ce^{4+}$ concentrations at 50° C. The 304 stainless steel corrosion rate of ~20 μm/hour was ~1000 times higher than the corrosion rate of 304 stainless steel in 97% $HNO_3$ at 50° C. (~0.023 μm/hr). In contrast, iridium did not corrode and had a corrosion rate of ~0.0 μm/hour in all cases (data not shown).

Elements in the 304 stainless steel alloy were dissolved in relatively uniform fashion. The concentrations of the elements in the electrolyte solution were determined and compared to literature values as shown in Table 1.

TABLE 1

| Element | Concentration (ppm) | Experimental wt % | Literature wt % |
|---|---|---|---|
| Cr | 17.8 | 16.53 | 16-18 |
| Fe | 79.4 | 73.74 | 68 |
| Mn | 1.85 | 1.72 | 2 |
| Mo | 0.205 | 0.19 | 2-3 |
| Ni | 8.42 | 7.82 | 10-14 |

Figure 4A:
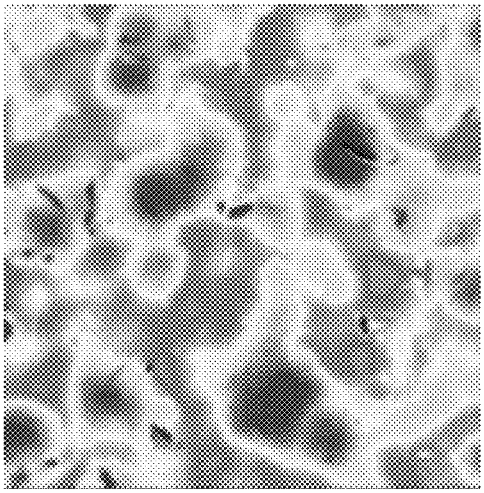
FIGS. 4A-4C are a topographic map (4A), an optical image (4B), and a 300× image (4C) of a 304 stainless steel surface before cleaning with a $Ce^{4+}$ electrolyte.
Figure 4B:
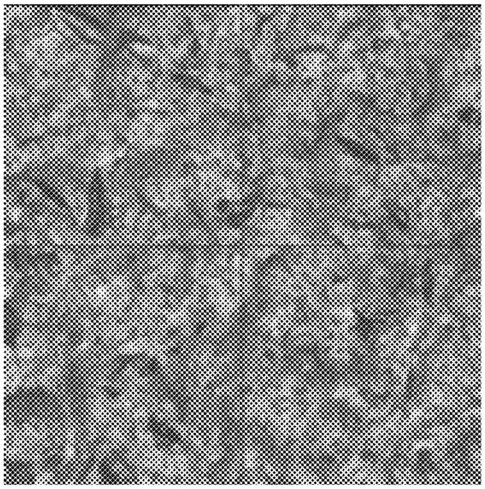
Figure 4C:
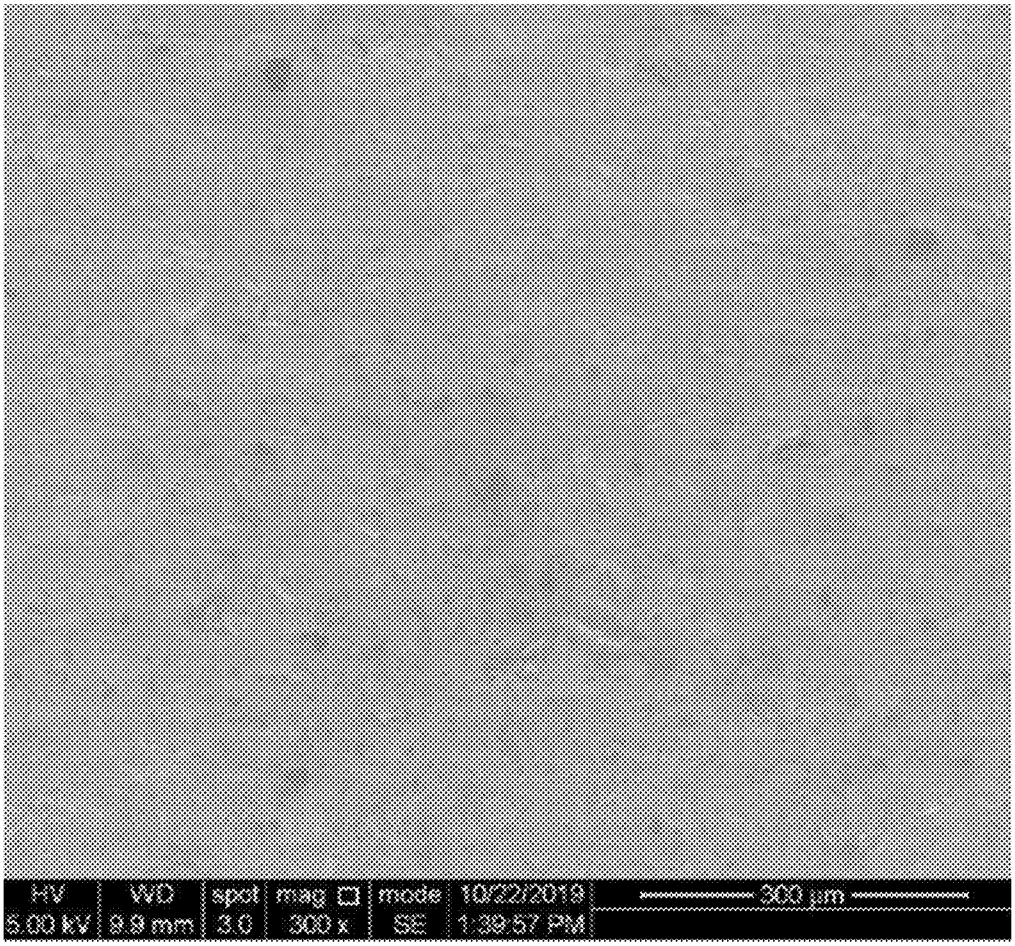
Figure 5A:
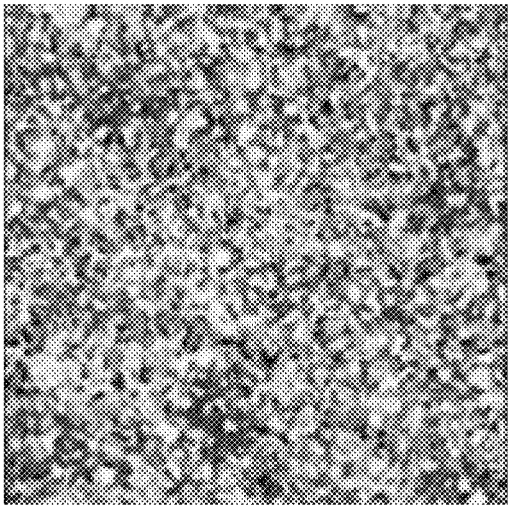
FIGS. 5A-5C are a topographic map (5A), an optical image (5B), and a 600× image (5C) of a 304 stainless steel surface after cleaning with a $Ce^{4+}$ electrolyte.
Figure 5B:
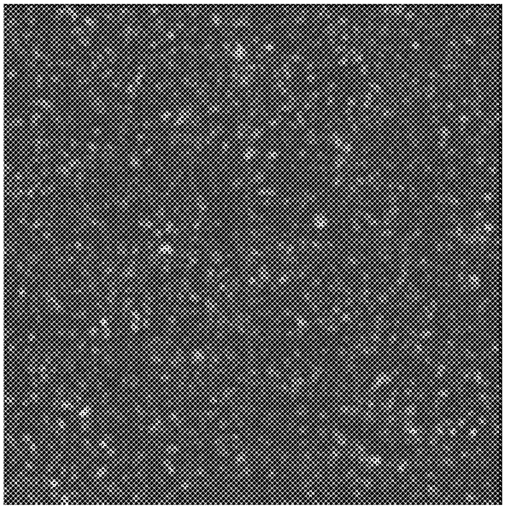
Figure 5C:
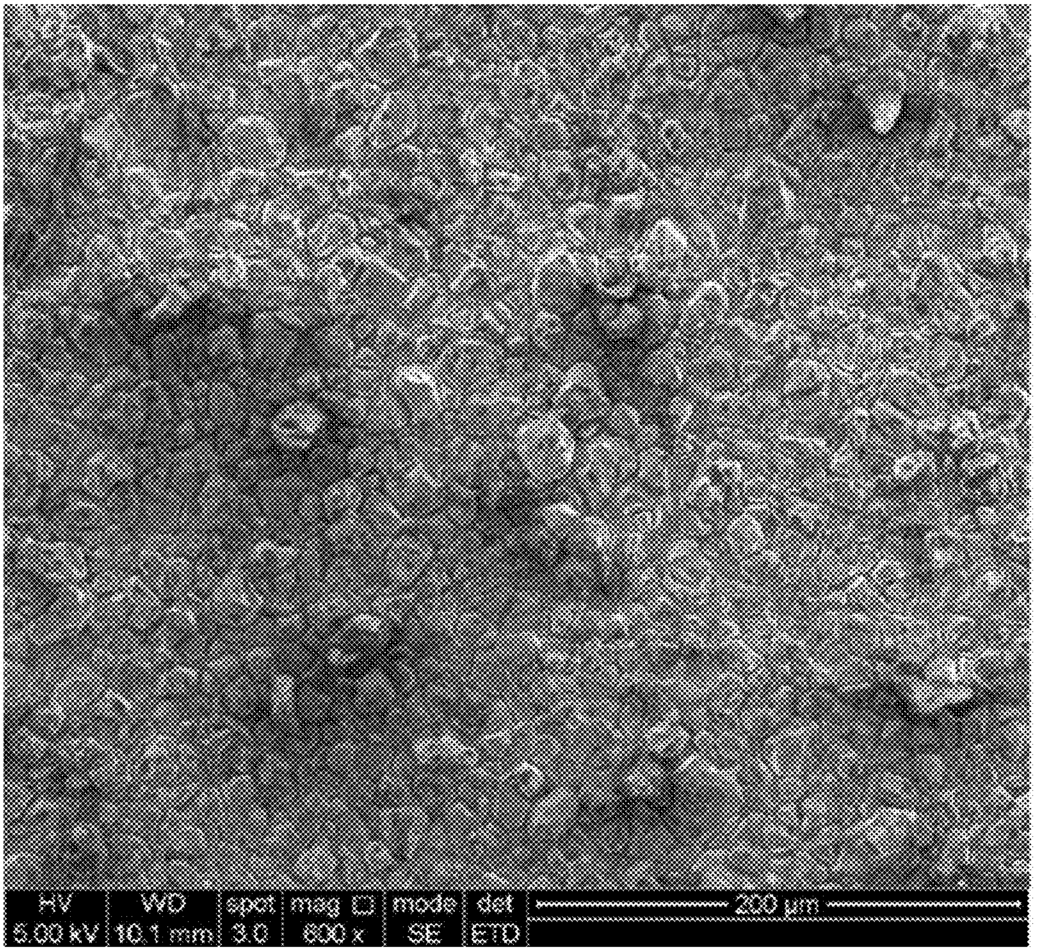

Surfaces of the 304 stainless steel were evaluated with a ZeGage™ Plus 3-dimensional optical surface profiler (Zygo Corporation, Middlefield, CT) before and after cleaning with the electrolyte. FIGS. 4A and 4B show the topographical map and an optical image, respectively, of the stainless steel before cleaning. FIG. 4C is a 300× image of the stainless steel before cleaning. FIGS. 5A and 5B show the topographical map and an optical image, respectively, of the stainless steel after cleaning. FIG. 5C is a 600× image of the stainless steel after cleaning. The root mean square roughness (RMS) prior to cleaning was 1.463 μm. The RMS after cleaning was 4.933 μm, demonstrating that the electrolytic solution removed material between the grain boundaries of the stainless steel, thereby forming a greater surface area, which is expected to provide better adhesion of polymer coatings.

Example 2

Metal Surface Coating

Liquid compositions comprising silicon carbide nanoparticles (NPs) or multi-walled carbon nanotube (MWCNT) nanoparticles in ProtectaClear® 130 polymer (Everbrite, Inc., Rancho Cordova, CA) were prepared. The commercially available ProtectaClear® 130 polymer is just one example of many polymers that may be suitable for embodiments of the disclosed process. The following compositions were prepared and ultrasonicated for 30 minutes prior to use:

TABLE 2

| Composition | NP mass (mg) | Volume of uncured polymer (mL) | Concentration in uncured polymer (mg/mL) | Percent NP mass in cured film (wt %) |
|---|---|---|---|---|
| Control | 0 | 4 | 0 | 0.00% |
| SiC 0.2 | 0.2 | 4 | 0.05 | 0.03% |
| SiC 0.4 | 0.4 | 4 | 0.1 | 0.07% |
| SiC 1 | 1 | 4 | 0.25 | 0.17% |
| SiC 3 | 3 | 4 | 0.75 | 0.50% |
| SiC 5 | 5 | 4 | 10.25 | 0.84% |
| MWCNT 0.2 | 0.2 | 4 | 0.05 | 0.03% |
| MWCNT 0.4 | 0.4 | 4 | 0.1 | 0.07% |
| MWCNT 1.4 | 1.4 | 4 | 0.35 | 0.24% |

316L stainless steel coupons were etched with methane sulfonic acid solution in a heated ultrasonic bath, rinsed with deionized water, cleaned with a basic detergent solution, and then rinsed again with the deionized water. Three layers of the liquid compositions were applied to the etched 316L stainless steel coupons. The vials of liquid composition were continuously ultrasonicated during application. Each layer was cured for 30 minutes at ~150° C. A person of ordinary skill in the art understands that the temperature and time, as well as application conditions, will depend on the particular liquid composition used.

Figure 6A:
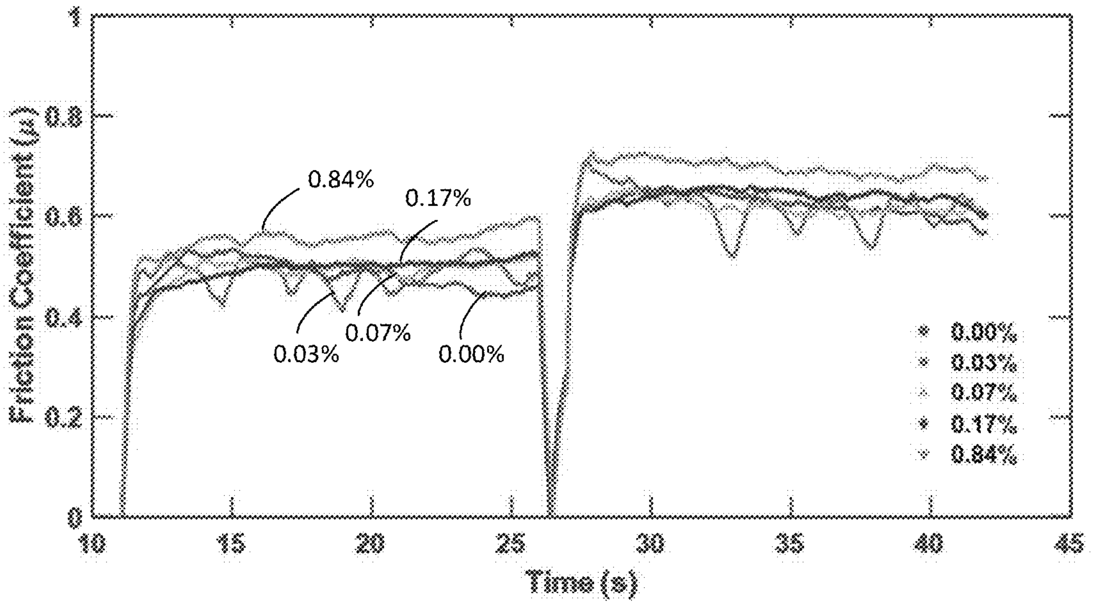
FIGS. 6A-6B are graphs showing the friction coefficient of coatings comprising an embodiment of a polymeric composition comprising silicon carbide nanoparticles (6A) or multi-walled carbon nanotubes (6B) when subjected to a nano-scratch test with an applied load of 100 μN.
Figure 6B:
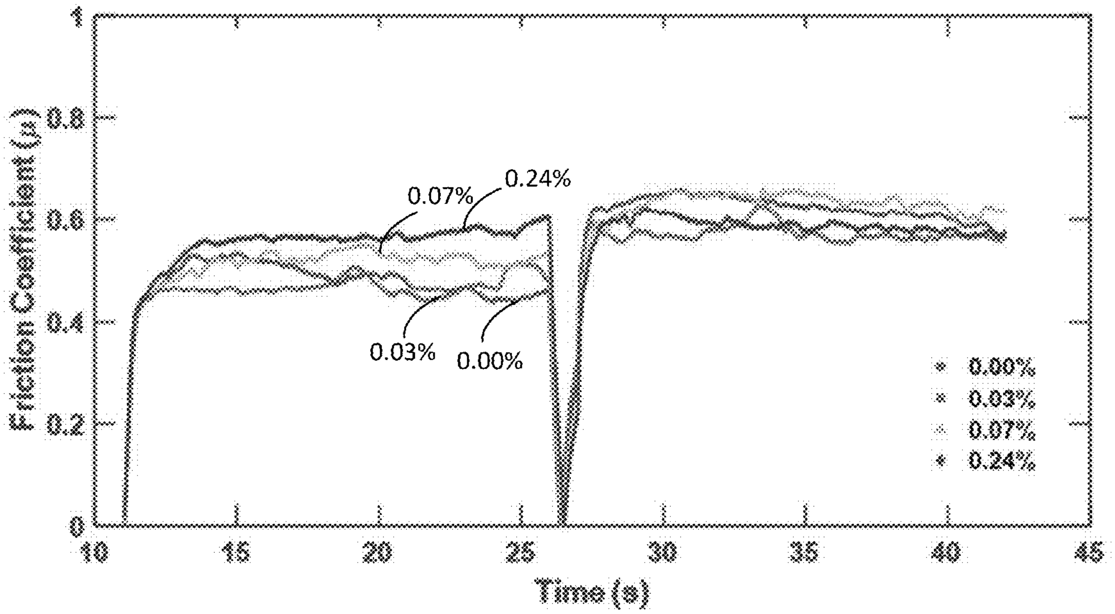

To further characterize the control polymer and to understand the effect of the nanoparticles on the morphological and mechanical properties of the nanocomposite polymers, a series of mechanical tests were performed, including nano-scratching (friction coefficient) and macro-scratching (friction coefficient). The nano-scratch tests were conducted on a Hysitron TI 950 TriboIndenter (Bruker Corporation, Minneapolis, MN). An applied load of 100 μN was used in the nano-scratch test to perform a single, forward and backward scratch on the top surface. The forward and backward scratches were each conducted for 20 seconds. The nano-scratch results are shown in FIGS. 6A (SiC nanoparticles) and 6B (MWCNT nanoparticles), which display the measured friction coefficient as a function of scratch time and nanomaterial loading. While absolute differences in the measured friction coefficient values were minimal, the data suggests differences as a function of nanomaterial loading. For both the SiC nanoparticles and MWCNTs, an increase in the friction coefficient as a function of loading was generally observed. The average friction coefficients from the forward scan with different scratches are presented in Table 3 for the compositions comprising SiC nanoparticles and MWCNTs. In both systems, an increase in the friction coefficient with increased nanomaterial loading was observed. From lubrication theory, this was unexpected as the inclusion of nanoparticles should decrease the coefficient of friction. As the nano-scratch measurement is only probing the top most layer of the polymer film, it is likely that the nano-scratch signal is dominated by surface roughness, which increases with nanomaterial loading. In this case, these preliminary results suggest that the nanoparticles or the nanotubes are segregating to the top interface. Finally, preliminary comparisons between SiC and MWCNT samples with similar loadings suggest that the MWCNT composite samples have a generally larger coefficient of friction. However, this comparison can only be made at low loadings (up to 0.07%).

TABLE 3

| Composition | NP Mass (g) | Percent NP mass in cured film (wt %) | Coefficient of friction (μ) |
|---|---|---|---|
| Control | 0 | 0.00% | 0.465 |
| SiC 0.2 | 0.2 | 0.03% | 0.491 |
| SiC 0.4 | 0.4 | 0.07% | 0.472 |
| SiC 1 | 1 | 0.17% | 0.486 |
| SiC 5 | 5 | 0.84% | 0.540 |
| CNT 0.2 | 0.2 | 0.03% | 0.459 |
| CNT 0.4 | 0.4 | 0.07% | 0.514 |
| CNT 1.4 | 1.4 | 0.24% | 0.539 |

Figure 7A:
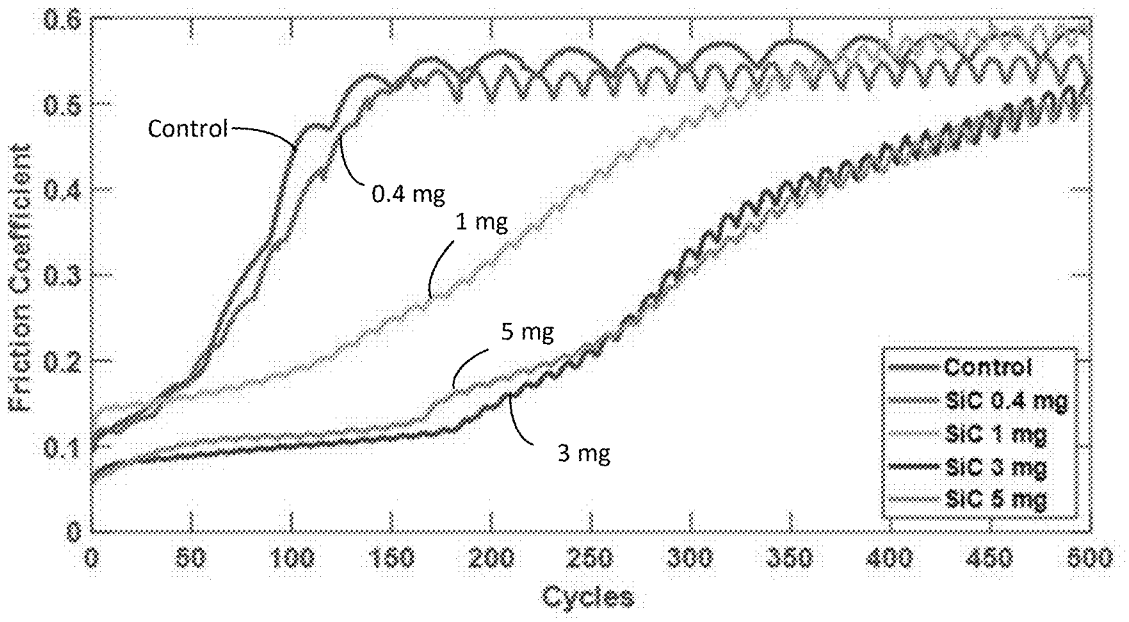
FIGS. 7A-7B are graphs showing the friction coefficient of coatings comprising an embodiment of a polymeric composition comprising silicon carbide nanoparticles (7A) or multi-walled carbon nanotubes (7B) when subjected to a macro-scratch test with an applied load of 5 N.
Figure 8:
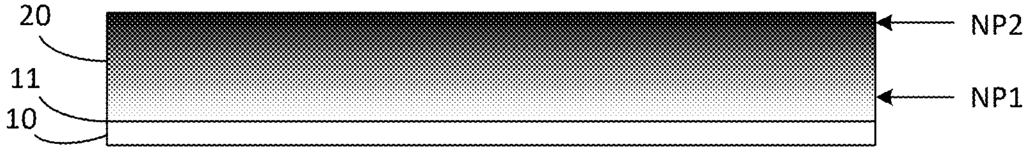
FIG. 8 is a schematic diagram showing a coated metal surface, wherein nanoparticles in the coating form a compositional gradient.

Macro-scratch analysis was employed as the principal technique to probe the mechanical (wear) properties of the composite films. A TRB tribometer from Anton-Paar GmbH (Graz, Austria) was used for macro-scratch analysis with an applied load of 5N using a steel ball. The friction coefficient was recorded for 500 cycles with a scratch length of 4 mm. A profilometer was also used to determine the depth of the macro-scratch. The coefficient of friction was recorded as a function of cycle number as shown in FIGS. 7A (SiC) and 7B (MWCNT). In both systems the coefficient of friction at the top interface was ~0.1 while the bulk surface coefficient of friction was ~0.5. Without wishing to be bound by a particular theory of operation, the values suggest that the nanoparticles segregated to the top surface and interrupted the cross-linking network. It is thought that these nanoparticles then acted as lubricants resulting a lower coefficient of friction (~0.1) at the surface. As the surface was scratched away, the bulk of the sample consisted of mainly cross-linked polymer with minimal nanomaterial concentration to lubricate the surface resulting in a higher coefficient of friction (~0.6). A schematic illustration of the compositional gradient is shown in FIG. 8. In FIG. 8, a metal 10 is coated with a polymeric coating 20 as disclosed herein. The polymeric coating first average nanoparticle concentration (NP1) at a first average distance from the metal surface 11 and a second average nanoparticle concentration (NP2) at a second, further average distance from the metal surface, wherein NP2>NP1.

Figure 7B:
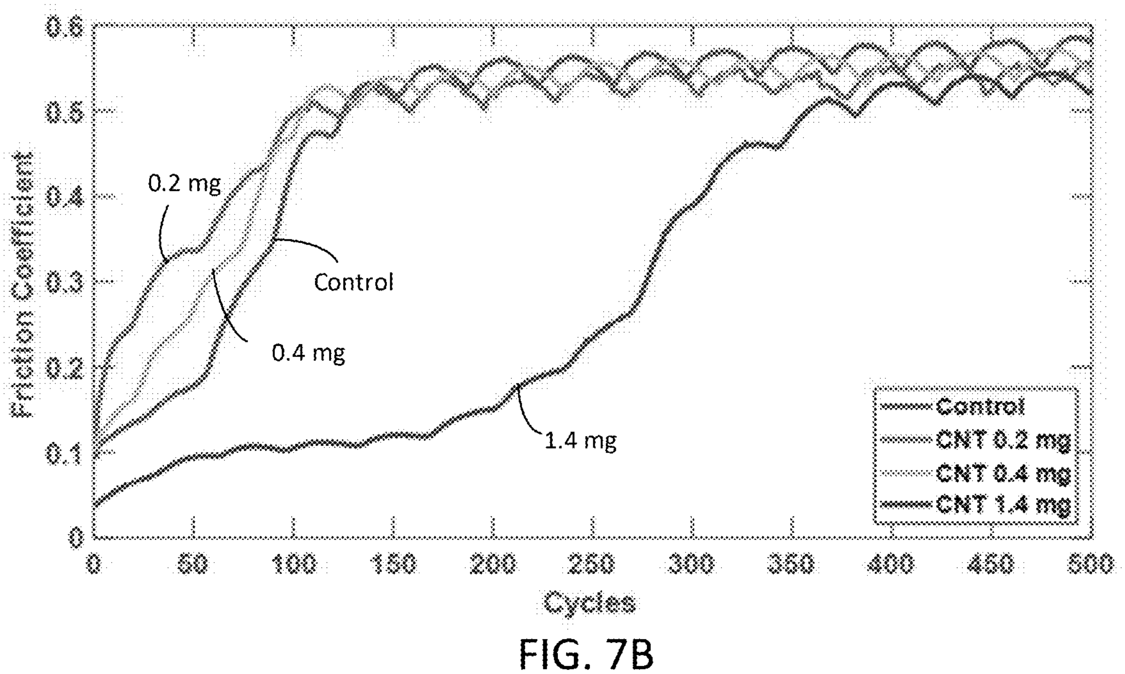

The key metric describing the improved wear properties as a function of nanomaterial loading is the number of cycles required to transition from the low coefficient of friction regime to the high coefficient of friction regime. A sample with a higher number of cycles for this transition to occur will have improved wear resistance. This would indicate that the particles are better dispersed throughout the film, enabling improved bulk lubrication and reduced wear. The results shown above in FIGS. 7A-7B indicate that increasing the nanoparticle loading resulted in an increase in the number of cycles for this transition to occur. In the SiC nanocomposite system, an improvement in the wear properties compared to the control sample was observed with a loading of 0.17%. There did not appear to be a difference in wear properties once the loading exceeded 0.50%. In the MWCNT nanocomposite system, appreciable improvement in wear properties was not observed until the loading was 0.24%. These observations may be attributable to the SiC nanoparticles having superior wear properties when compared to MWCNTs.

Figure 9A:
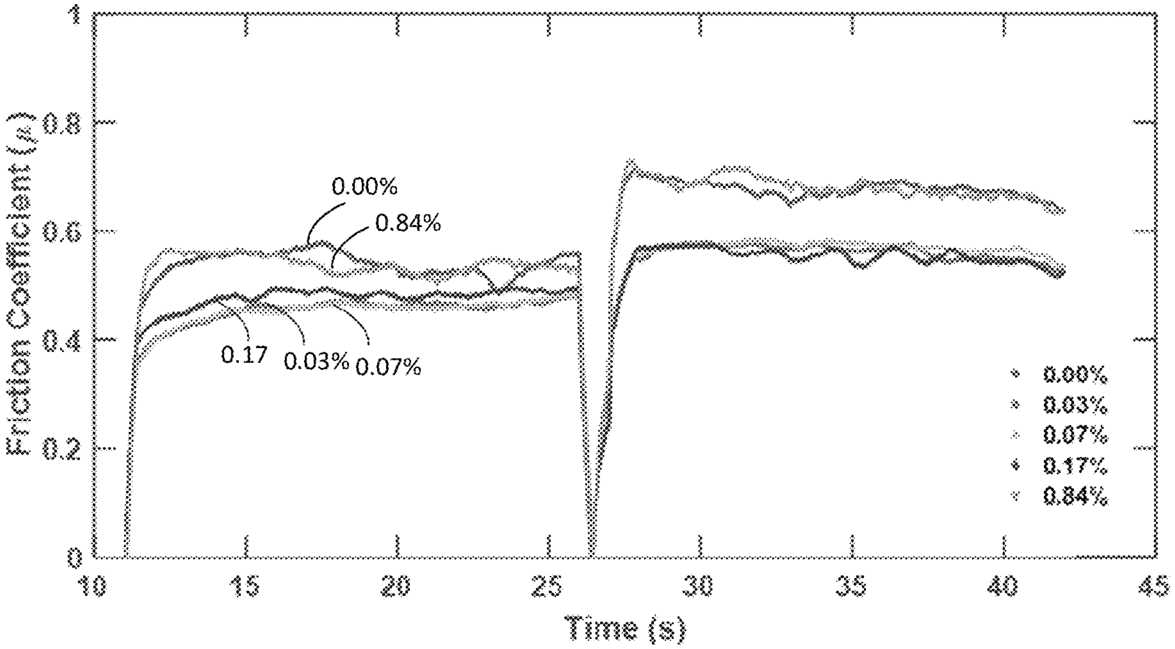
FIGS. 9A-9B are graphs showing the friction coefficient of coatings comprising an embodiment of a polymeric composition comprising silicon carbide nanoparticles (9A) or multi-walled carbon nanotubes (9B) when exposed to a dose of gamma radiation and then subjected to a nano-scratch test with an applied load of 100 μN.
Figure 9B:
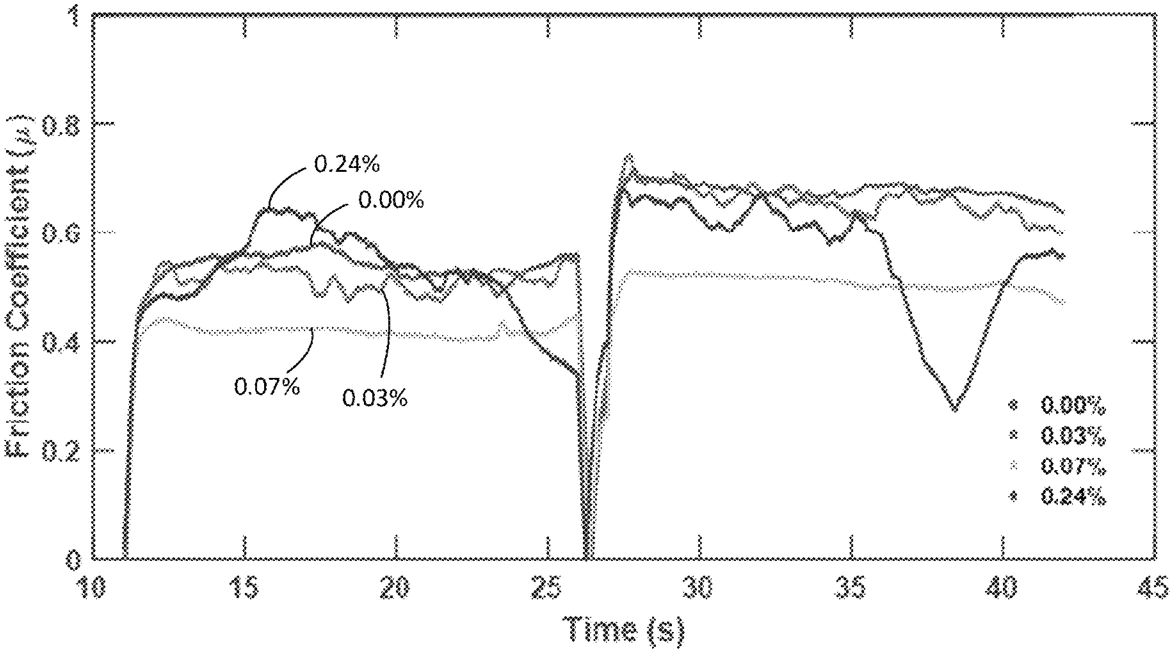

The samples were then exposed to a dose of gamma radiation of ~2E3 Gy. The mechanical characterization tests were repeated (nano-scratch and macro-scratch) to determine if the radiation caused changes to the polymer physical properties. No visible changes were evident. The nano-scratch results are shown in FIGS. 9A (SiC) and 9B (MWCNT). In these post-irradiation samples, the control displays the highest coefficient of friction at 0.538. The lowest nanomaterial loading displayed the lowest coefficient of friction in both the SiC and MWCNT nano-composite systems. The coefficient of friction then increased with increasing nanomaterial loading, generally mirroring the trend observed in the pre-irradiated samples.

Average friction coefficients from three separate scratches on the same sample are displayed in FIGS. 10A-10B for both SiC and MWCNT composite systems, respectively, pre- and post-irradiation. Notably, the coefficients of friction were generally lower post-irradiation, with the exception of the control sample. The lower coefficient of friction post-irradiation could arise from the breakdown of cross linkages, resulting in a lubrication layer. Alternatively, it is possible that these samples simply display lower surface roughness. The type of nanomaterial as well as the type of the functional group present on the nanostructure, which directly determines their linkage and distribution in the polymer matrix, might affect the nano-composite polymer response to the irradiation.

Example 3

Characterization of Polymer Adhesion on Surface-Treated Stainless Steel

Sylgard™ 184 (Dow Inc.) silicone elastomer was purchased from Fisher Scientific (Waltham, MA) and used as received. Sylgard™ 184 is a two-part silicone elastomer kit consisting of an elastomeric prepolymer (base) and a cross-linker (curing agent). Cellulose base tape was purchased from Fisher Scientific and used as received. Stainless-steel substrates received from McMaster-Carr (Elmhurst, IL).

Substrate 1 was received with a polished surface finish, and substrate 2 was received with a rougher surface finish. These substrates were only cleaned with isopropyl alcohol. Substrate 3 was originally identical to substrate 1. Substrate 3 was subjected to chemical etching (cerium (IV) nitrate) for several hours at elevated temperature. FIG. 11 shows the three substrates.

Sylgard™ 184 base and curing agent were mixed at a ratio of 10:1 (base:curing agent) as specified by the manufacturer. To ensure uniform preparation, the material was further mixed in a THINKY planetary mixer (FlackTek Speed-Mixer® company, Landrum, SC) for 2 minutes at 2000 R.P.M. to prevent bubbles in the mixture. The mixture, 2.5 g, was then cast and spread along the substrate surfaces. The samples were allowed to cure in an oven at 22° C. for 3 days. Following the curing, excess material was removed to form a 100 mm by 30 mm sample on the substrate surface. Cellulose base tape adhesive was applied to the substrates and cut to a sample size of 100 mm×30 mm before applying to the substrate surface.

Microscope images of the metal substrates were taken using a KEYENCE VHX-6000 digital microscope (Keyence Corporation of America, Itasca, IL). Photographs were captured under full ring lighting conditions at 50×, 200×, 500×, and 1000×. Surface topography of the substrates was investigated by 3D capture to measure surface roughness and height.

Peel-off testing is a method of measuring the peeling force required to remove an adhesive from a surface. Characterization of the peeling force provides an understanding of the adhesion of materials (Awalekar et al., *Proceedings of Engineering and Technology Innovation* 2018, 10:19). Adhesion tests were performed using an ADMET eXpert 7601 frame (Admet, Inc., Norwood, MA) with manual vise GV-1T serrated grip (for gripping and pulling of theadhesive), and an ADMET FS-PL-90 peel-off apparatus (for attaching sample substrate and adhesive). A schematic diagram of the 90° peel-off test is shown in FIG. 12—substrate 1210, adhesive 1220, and peel-off apparatus 1230. The arrow indicates the angle of force.

FIG. 13 shows surface photographs of the three metal substrates under full-ring lighting at 50×, 200×, 500×, and 1000× magnification. The surface of substrate 1 appears smooth, while substrate 2 displays some roughness. Finally, substrate 3 shows a very granular surface.

Surface roughness measurements are shown in Table 4, where $S_a$ (arithmetical mean height) and $S_z$ (maximum height) were calculated from 3D micrographs to evaluate the roughness of the metal substrates. $S_a$ is the extension of the arithmetical mean surface height along a line extended to the surface. This value is used to generally evaluate the roughness of a surface. $S_a$ of samples 1 and 3 are similar with a value below 3 μm. Sa is significantly higher with a value of 4.2 μm. This difference is attributed to deeper defects (pits). $S_z$ is defined as the sum of the largest peak height value and largest pit depth value (withinan area). $S_z$ for sample 1 shows a value of about 14 μm, which is much lower than samples 2 and 3 which are 28.9 and 24 μm, respectively. These higher values are due to the increased roughness of these samples.

TABLE 4

| Sample | $S_a$ (μm) | $S_z$ (μm) |
|---|---|---|
| 1 | 2.88 | 14.04 |
| 2 | 4.18 | 28.86 |
| 3 | 2.76 | 24.03 |

The average peel force required to remove the adhesive (Sylgard 184™ elastomer or labeling tape)from the metal substrates was determined with the peel off test. The difference in peel-off force between substrates and adhesive can help understand the effect of etching on surface adhesion. Average peel force measurements are shown in Table 5, and the corresponding graphs are shown in FIGS. 14A (Sylgard 184™ elastomer) and 14B (labeling tape). The asterisks in Table 5 and FIG. 14A indicate that the sample broke from the tension before the adhesive peeled off.

TABLE 5

| Sample | Labeling Tape Average Peel Force (g) | Sylgard 184 ™ Elastomer Average Peel Force (g) |
|---|---|---|
| 1 | 195 (0.43 lb.) | 7.7 (0.017 lb.) |
| 2 | 191 (0.42 lb.) | 19 (0.042 lb.) |
| 3 | 254 (0.56 lb.) | 318 (0.70 lb.)* |

The data from Table 5 and FIGS. 14A-14B clearly show that the force needed to peel off cellulose tape was similar for Samples 1 and 2 at 0.4 lb. The force needed to peel off the same tape off sample 3 was 33% higher at 0.6 lb. In the case of Sylgard 184™ elastomer, a peel force of 0.017, 0.042 and 0.70 lb. was required for substrates 1, 2, and 3 respectively. The force needed to peel Sylgard 184™ elastomer off of substrate 3 was 3500% and 1400% higher at 0.7 lb. than substrates 1 and 2, respectively. For substrate 3, the bonding of the adhesive was so strong that the adhesive proved too difficult to peel, as shown by the data in FIGS. 14A-14B and the photograph in FIG. 15.

After the failed peel test on substrate 3, toluene was used in an attempt to remove the Sylgard 184™ elastomer by swelling. When that failed, a blade was used to scrape the Sylgard 184 from the surface. After scraping, a thin layer of Sylgard 184™ elastomer film was still adhered deeplyinto the substrate surface. Toluene and chloroform were then used in an additional attempt to remove the Sylgard 184™ elastomer thin film, but failed, leaving a thin hydrophobic coating on substrate 3 (FIG. 16).

Peel-off tests also were performed with etched stainless substrates coated with ProtectaClear® 130 polymer (Everbrite, Inc., Rancho Cordova, CA). However, a connection between parts of the test apparatus broke before the polymer coating peeled off the etched stainless steel substrate.

The data indicates that the etching pattern of substrate 3 causes materials to adhere more strongly as demonstrated by the increase in average peel force. Additional chemical (toluene, chloroform) and physical (scraping with a blade) attempts to remove the Sylgard 184™ elastomer from substrate 3 failed, demonstrating a unique adhesion between the etched stainless steel substrate and the Sylgard 184™ elastomer. The unique properties of the etched surface (very high adhesion potential) demonstrates the potential for use of coatings to recover metal apparatus (e.g., gloveboxes) decontaminated by the electrochemical etching process.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for providing a coated metal surface, comprising:

etching a metal surface of a continuously solid metal substrate with an etching solution comprising an oxidizing ion to provide an etched metal surface, the oxidizing ion comprising Ce(IV);

coating at least a portion of the etched metal surface with a liquid composition comprising a crosslinking agent and either a polymer or a prepolymer to provide a polymeric coating on the etched metal surface, wherein the liquid composition further comprises a plurality of nanoparticles, the nanoparticles comprising carbon nanotubes; and drying or curing the polymeric coating to form a coated metal surface.

2. The method of claim 1, wherein a concentration of the oxidizing ion in the etching solution is 0.1 M to 1 M.

3. The method of claim 1, wherein etching the metal surface with an etching solution comprising an oxidizing ion comprises contacting the metal surface with the etching solution that comprises an oxidizing ion for a period of time ranging from 10 minutes to 48 hours.

4. The method of claim 1, wherein coating at least a portion of the etched metal surface with a liquid composition comprises applying the liquid composition on the etched metal surface with a brush, spraying the liquid composition onto the etched metal surface, flowing the liquid composition across the etched metal surface, dipping the etched metal surface into the liquid composition, spin-coating the liquid composition onto the etched metal surface, or blade-coating the liquid composition onto the etched metal surface.

5. The method of claim 1, wherein coating at least a portion of the etched metal surface with a liquid composition comprises applying one or more layers of the liquid composition.

6. The method of claim 1, wherein:

(i) an average root mean square (RMS) roughness of the metal surface prior to etching is 0.5 μm to 2 μm; or (ii) an average RMS roughness of the etched metal surface is 4 μm to 6 μm; or (iii) both (i) and (ii).

7. The method of claim 1, wherein a single layer of the polymeric coating, after drying or curing, has an average thickness of 20 μm to 60 μm.

8. The method of claim 1, wherein the coated metal surface has an average coefficient of friction $\mu \leq 0.7$ over 500 cycles with a stainless steel ball and an applied force of 5N.

9. The method of claim 1, wherein:

(i) a concentration of the nanoparticles in the liquid composition is greater than 0 mg/mL and up to 10 mg/mL; or (ii) a concentration of the nanoparticles in the coating, after drying or curing, is greater than 0 wt % and up to 10 wt %; or (iii) both (i) and (ii).

10. The method of claim 1, wherein the polymeric coating has a composition gradient with a first average nanoparticle concentration (NP1) at a first average distance from the metal surface and a second average nanoparticle concentration (NP2) at a second, further average distance from the metal surface, wherein NP2>NP1.

11. The method of claim 1, wherein a concentration of the nanoparticles in the coating, after drying or curing, is 0.2 wt % to 2 wt %.

12. The method of claim 1, wherein the nanoparticles further comprise Si-based nanoparticles, graphene, or a combination thereof.

13. A method for providing a coated metal surface, comprising:

etching a metal surface of a continuously solid metal substrate with an etching solution comprising an oxidizing ion to provide an etched metal surface, the oxidizing ion comprising Ce(IV);

coating at least a portion of the etched metal surface with a liquid composition comprising a polymer, a prepolymer and a crosslinking agent, or a combination thereof to provide a polymeric coating on the etched metal surface, wherein the liquid composition further comprises a plurality of nanoparticles, the nanoparticles comprising carbon nanotubes; and drying or curing the polymeric coating to form a coated metal surface, wherein a concentration of the nanoparticles in the coating, after drying or curing, is 0.2 wt % to 2 wt %.

* * * * *